United States Patent [19]
Bornemisza-Wahr et al.

[11] Patent Number: 6,073,119
[45] Date of Patent: Jun. 6, 2000

[54] METHOD AND SYSTEM FOR BANKING INSTITUTION INTERACTIVE CENTER

[75] Inventors: Sylvia Bornemisza-Wahr, Los Angeles, Calif.; Kevin Sy Lam, Singapore, Singapore; Frank McCallick, Ventura, Calif.; Roy Sinai; Peter Paradiso, both of Santa Monica, Calif.; Howard A. Schechtman, Agoura Hills, Calif.; Kenneth J. Randall, Redondo Beach, Calif.; Peter Tompkins, Malibu, Calif.; Teresa A. Petach, Los Angeles, Calif.

[73] Assignee: Citicorp Development Center, Inc., Los Angeles, Calif.

[21] Appl. No.: 08/984,331

[22] Filed: Dec. 3, 1997

Related U.S. Application Data
[60] Provisional application No. 60/057,905, Sep. 4, 1997.

[51] Int. Cl.⁷ .................................................. H04N 7/14

[52] U.S. Cl. .............................................................. 705/42

[58] Field of Search ................................... 705/42, 43, 1; 348/13, 14, 15

[56] References Cited

U.S. PATENT DOCUMENTS

| | | | |
|---|---|---|---|
| 5,053,956 | 10/1991 | Donald et al. | 348/13 |
| 5,267,314 | 11/1993 | Stambler | 705/43 |
| 5,305,195 | 4/1994 | Murphy | 235/379 |
| 5,600,114 | 2/1997 | Dunlap et al. | 705/1 |
| 5,787,403 | 7/1998 | Randle | 380/24 |
| 5,805,204 | 9/1998 | Thompson et al. | 395/560 |

*Primary Examiner*—Tod R. Swann
*Assistant Examiner*—Matthew Smithers
*Attorney, Agent, or Firm*—George T. Marcou; Kilpatrick Stockton LLP

[57] ABSTRACT

This invention generally relates to a banking facility layout and a method and system for networked customer and other user interaction with a variety of functions. These functions include access to networks, such as the internet, email capability, options to view information on banking capabilities, access to home banking, and other electronically-related user functions. The invention incorporates a purpose-designed environment that can be integrated into a branch or other banking institution facility. The invention also includes a video wall feature that allows interaction by networked users; users may take control of portions of the wall and add selected information to these portions.

34 Claims, 15 Drawing Sheets ns 6,073,119

METHOD AND SYSTEM FOR BANKING INSTITUTION INTERACTIVE CENTER

This application claims benefit of Provisional Application No. 60/057,905 filed Sep. 4, 1997.

FIELD OF THE INVENTION

This invention generally relates to a banking facility layout and a method and system for user interaction with automated and other features at a banking institution. In particular, these features include access to the internet, email capability, options to view information on banking capabilities, access to home banking, other electronically-related user functions, and a video wall feature that allows simultaneous interaction by one or more networked users.

BACKGROUND OF THE INVENTION

A problem with existing art for banking institutions, particularly branches, is that they are not designed to attract customers and other users who want to have a meaningful relationship with these institutions. Currently, most customers, potential customers, and other visitors seek quick services at branches; they do not browse, seek advice, or attempt to learn other information, such as current events in their city or town.

Customers and others have a need, however, to talk with banking institution representatives, obtain more information, and guidance, and also obtain other services that they don't typically associate with banking institutions, such as brokerage and investment services.

Further, there is a need for banking institutions or their subsidiaries to provide the general public, as well as their own customers, with information for making use of, for example, banking institution content that has been developed for use with the internet or other materials that have been developed by these institutions, such as tutorials and seminars. There is also need to provide this information in a way that is interactive and interesting for people accessing the information, as well as informative, so that users have a good learning experience at the banking institution.

In addition, there is a need for these services to be provided in such a way that customers or potential customers—such as passersby on the street near the banking institution—are physically attracted to these services. There is a need for the services to be presented in a visually stimulating way.

There is a need to provide services and information relating to the banking institution and electronic services in general that are simple to understand and overcome actual or potential user confusion. There is a need for internet services and other information to be presented in a user-friendly way that fosters use of banking institution services relating to these information sources.

There is a need for banking institutions to continually update and change their approach to attracting customers, especially with the changing ways that customer needs are met, such as electronic banking and internet-related services. In this regard, there is a need to present services to customers and other users in a format that contains a process for regularly changing and updating material presented.

SUMMARY OF THE INVENTION

It is an object of the present invention to provide a community learning center for customers and other users. It is a further object of the present invention to provide a community video wall. It is a further object of the present invention to provide networked workstations for interaction with the video wall.

It is a further object of the present invention to provide users with an option to select information to display on the video wall. It is a further object of the present invention to provide users with an option to select information from the video wall for display on workstations.

It is a further object of the present invention to provide an interactive internet-oriented environment for banking institution customers and other users. It is a further object of the present invention to provide demonstrations of internet banking services. It is a further object of the present invention to provide users with selective access to networks, such as the internet, and functions on networks.

It is a further object of the present invention to provide users with video information displays. It is a further object of the present invention to provide variable user access to the workstations for a community learning center. It is a further object of the present invention to provide users with access to electronic mail. It is a further object of the present invention to provide users with access to television broadcasts.

In order to meet these objects, the present invention includes several components. The primary component is a video wall, which functions as an attractor element. A secondary component is a system of interactive features for the video wall and workstation setup, which allows users to interact with the electronic billboard, by, for example, participating in a seminar that's being displayed, by learning by viewing a scenario on the workstation in front of this video wall, or by exploring different websites being displayed In addition to providing an interactive environment that attracts customers and other users to the banking institution, an embodiment of the present invention allows the banking institution to increase awareness of banking institutions services, such as internet offerings. These functions are accomplished by the present invention via a platform for information transmittal, including internet, other electronic format, and prerecorded video, for display on the video wall. In an embodiment of the present invention, the wall includes a calendar of events that includes such events as seminar scheduling. The workstations include a technical system for playing back material, having the capability for a number of presentation formats, such as digital video capability and transmission of internet information.

To achieve the stated and other objects of the present invention, as embodied and described below, the invention includes a method for a user to obtain banking related interactive information services on a network in an interaction area by enrolling the user for access to the interaction area, issuing the user key access to the interaction area, inputting the key access at the interaction area, logging on to a terminal on the network, automatically providing the logged on user with a selection of interactive information services, the user selecting an interactive information service, and the user interacting with the interactive information service.

Additional objects, advantages and novel features of the invention will be set forth in part in the description which follows, and in part will become more apparent to those skilled in the art upon examination of the following or may be learned by practice of the invention.

DETAILED DESCRIPTION

Figure 1:
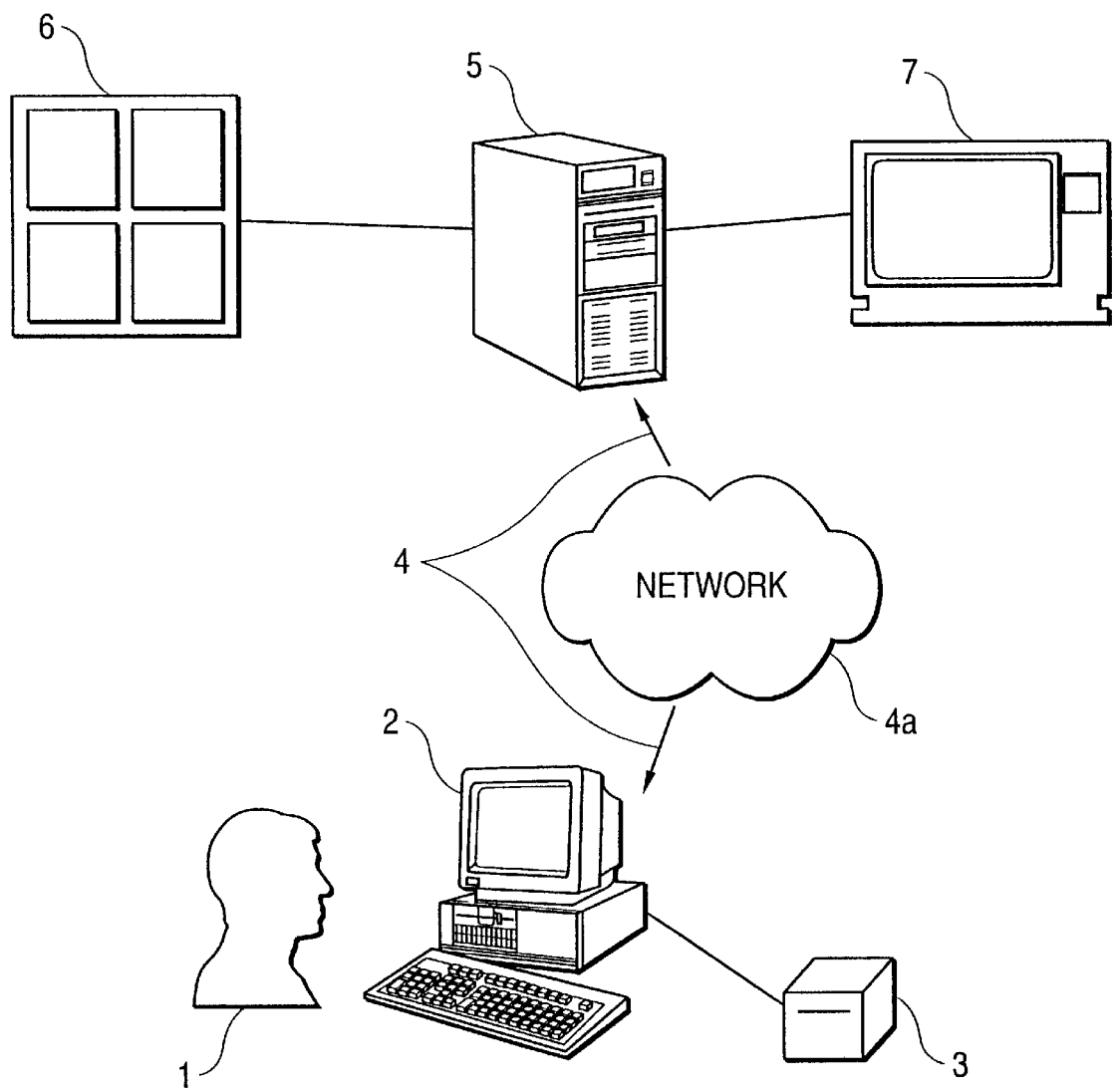
FIG. 1 presents a general overview of an embodiment of the present invention.

In order to overcome the problems of existing art, the present invention includes several components. The primary component is a video wall, which functions as an attractor element. A secondary component is a system of interactive features for the video wall and workstation setup, which allows users to interact with the electronic billboard, by, for example, participating in a seminar that's being displayed, by learning by viewing a scenario on the workstation in front of this video wall, or by exploring different websites being displayed In addition to providing an interactive environment that attracts customers and other users to the banking institution, an embodiment of the present invention allows the banking institution to increase awareness of banking institutions services, such as internet offerings. These functions are accomplished by the present invention via a platform for information transmittal, including internet, other electronic format, and prerecorded video, for display on the video wall. In an embodiment of the present invention, the wall includes a calendar of events, such as seminar scheduling. The workstations include a technical system for playing back material, having the capability for a number of presentation formats, such as digital video and transmission of internet information.

In an embodiment of the present invention, the workstations and video wall are connected via a network. The networked environment allows users to grab and share information via the video wall: a user may "grab" information from the video wall for display on the user's workstation; the user may "share" information by selecting information on the user's workstation for display on the video wall. The grab and share functions are particularly useful when two users are interacting. For example, if two users are discussing a topic and one of them finds a website relevant to the topic, that user can share the website on the video wall, allowing both users to view the website. The second user can also grab the image from the video wall and view it on the second user's workstation. In addition, users can grab other images, such as video images from cable television.

In addition to providing an interactive environment that attracts customers and other users to the banking institution, the present invention allows the banking institution to increase awareness of banking institutions services, such as internet offerings, and to educate customers and other users on available products and information.

An embodiment of the present invention is referred to as a community learning center, also known as an interactive center (IC). The community learning center is a place where customers and other users can browse through information that the banking institution has regarding such things as its global resources. In addition, the community learning center serves as a staff location. Staff are a critical component of the center because they interact with the customers and other visitors.

A sample event that occurs at the IC could include, for example, a tutorial on how to plan a trust. In addition, the IC could connect the customer or other user with a legal firm that is partnered with the banking institution or provide either a prerecorded video or display other information, such as relevant legal forms. All of this can be conducted by the customer or visitor at a workstation. Thus, the IC is a community place that brings people together who have similar interests, and it's a place for the banking institution to interact with the customer, potential customers, and other users.

The present invention helps the banking institution sell services, by virtue of attracting customers and other users and initiating a dialogue. The present invention can serve as part of a showcase featuring technology at the banking institution. Thus, the invention reflects a strong commitment to bring new technology to consumers in effective and a useful ways.

For example, information housed in an embodiment of the present invention can include non-banking information, such as local events and points of interest relating to the community. Information is provided via a menu of resources. In an embodiment of the present invention, the menu also provides a flavor for internet resources that are available, in a user friendly way. The environment is comfortable to the user, and the presentation attracts customers and other users.

The present invention thus serves as a learning environment and a community space with guest speakers and prerecorded presentations. To address confusion and difficulties encountered with internet navigation, the present invention includes workstations with prefiltered and preorganized locations selected on the worldwide web. In an embodiment of the present invention, these locations include banking institution web locations.

In an embodiment of the present invention, to assist the user further, the workstations include ten navigation buttons that cover such things as retirement planning, business news, and financial tools. The buttons may be varied by the operator in order to emphasize particular banking institution promotions or other items of interest.

In addition, in an embodiment of the present invention, internet access is via high-bandwidth technology so that response time is extremely fast, further enhancing customers' and other users' experiences with information and services. Customers or other users thus may also more easily access other services, such as videotaped seminars for educating them about banking institution products and services and other related topics, such as financial planning, college tuition for their children, refinancing homes, and retirement planning. The seminars can also be broadcast via live camera feed to the workstations and video wall.

An embodiment of the present invention includes a designed media presentation technology with one or more workstations, such as personal computers (PCs), with screens, keyboards, and attached mice, that include user software. The method and system help guide the user to the internet and other electronic media that have been prepared. For example, if the banking institution is working hard to build an internet presence, the present invention serves as a place to introduce the user to that internet presence.

The information that is available on the worldwide web is organized into certain categories for the user. For example, under money management, the system may refer the user to several different interesting web sites; instead of the user having to type in a search and receiving 30,000 answers, none of which are really what the user wanted, the banking institution has already conducted those kind of searches for the user and categorized them.

Also, because many people who own a PC are not on the internet, the banking institution can be help them get connected. This helps ensure that future customers and other users become more aware of value that the internet and the banking institution provide.

References will now be made in detail to an embodiment of the present invention, an example of which is illustrated in the accompanying drawings.

FIG. 1 presents an embodiment of the present invention. A user 1 accesses a workstation 2 after accessing a card reader 3 coupled to the workstation 2. The workstation 2 is coupled 4 via a network 4a to a server 5. The server 5 is coupled to a video wall 6, and the server is also coupled to video displays 7, such as televisions.

An embodiment of the present invention will now be described. This embodiment is representative of the functions that may be included with the system and is not intended to be fully comprehensive or to limit the invention to those features described.

In an embodiment of the present invention, access to a station in the IC takes place by dipping a card. A record of each card dip at any workstation is logged on the database. The type of card and the level of entitlement of an administrative login (in case of Login Card) determine which set of functionality (user workstation, staff workstation, enrollment workstation) is presented to the user.

Figure 2A:
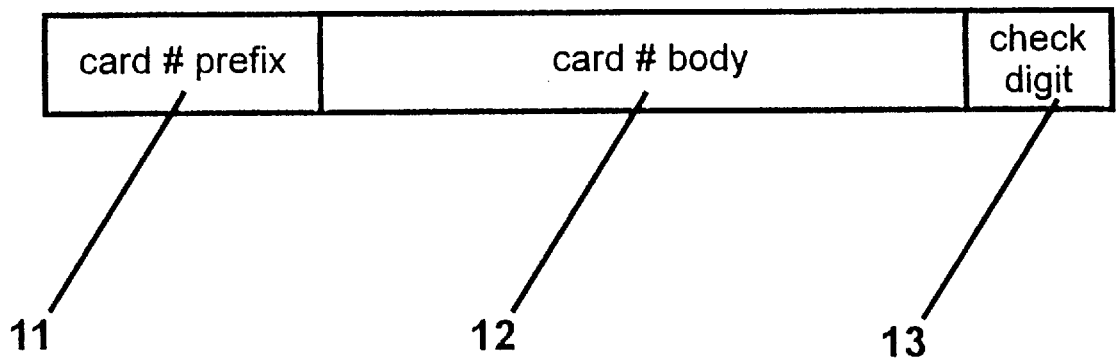
FIGS. 2A and 2B are representations of card numbering code elements for an embodiment of the present invention.
Figure 2B:
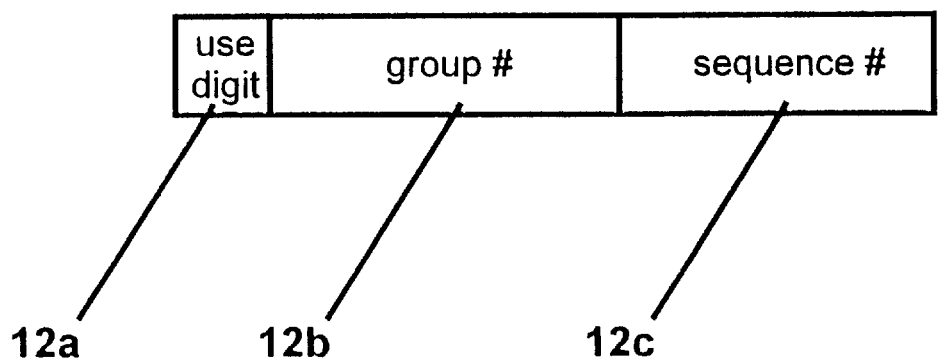

In an embodiment of the present invention, a unique prefix is assigned for IC Guest Cards, so that Guest Cards do not conflict with ISO standard card number assignments. For cards issued, a numbering scheme that uniquely identifies guest or (admin) login users is used. As shown in FIG. 2A, in an embodiment of the present invention, the card number 10 has the following sections: card number prefix 11, card number body 12, and check digit 13. As shown in FIG. 2B, the card number body 12 has the following sections: use digit 12a, group number 12b, and sequence number 12c.

Bank customers with bankcards or smartcards gain access to either a public or the private user workstation by dipping their bankcard into the dynamic card reader of the User Workstation. Customers with bank credit cards—VISA, MasterCard, and Diners—including international bank credit card customers, also gain access to a workstation by dipping the Card into the dynamic card reader. A user dipping this kind of card accesses the IC User Workstation functionality. Neither customers nor guests enter PINs to use the Public (or Private) workstations.

The card reader extracts the name of the user from the bankcard and uses it to greet the user in the opening screen of the User Workstation interface and to bid good-bye to the user at the termination screen.

Guests who do not have the bank's bankcard must obtain a temporary "Guest Card" by enrolling at the Enrollment Station located in the Greeter area. "Guest Cards" only allow access to the Public User Workstation. Guests dip their Guest Card magnetic strip into the dynamic card reader located at the Public User Workstation. A user dipping this kind of card may access the IC User Workstation functionality. No PIN entry from the guest is required. The card reader extracts the name of the guest from the magnetic strip guest card and uses it to greet the guest in the opening screen of the User Workstation interface and to bid good-bye to the guest at the termination screen.

Staff Users (e.g., Info Master, Greeter) are issued Login Cards. Login Cards are also issued at the Enrollment Station. In a separate process, the staff user is set up with a login name, password and a level of entitlement. A staff user having appropriate privileges for creating/disabling login accounts on the IC database provides access to staff users.

Administrative login accounts have different levels of entitlement. The level of entitlement determines which set(s) of functionality the user can access. The levels of entitlement for the staff of the IC are: Staff User (can access Staff Workstation (WS) and User WS functionality); Enrollment User (can access Enrollment WS and User WS functionality); and All (can access Staff WS, Enrollment WS and User WS functionality). When a Login Card is dipped and recognized, the staff user is presented with a login screen that asks for username and password. If the username and password are authenticated, the user interface for the primary set of functionality is presented.

An embodiment of the present invention includes a graphical user interface (GUI) for the user. The On the Tool Bar of the user interface is a toggle button to allow the user to switch to other entitled set(s) of functionality. Any time the staff user switches back from User Mode to an admin mode (staff mode or enrollment mode), the staff user is prompted for login name and password again.

Under certain conditions the branch manager can choose to disable cards—either for users or for staff. The conditions and methods for disabling for an embodiment of the present invention are described below. It may be necessary or desirable to begin disabling user Guest Cards when: 1) usage of the Information Zone becomes heavy; or 2) there is another need to limit valid usage period of a card. This is accomplished by disabling certain Guest Card prefix ranges and/or disabling by date of issuance written on the track of the card.

It may be necessary or desirable to begin disabling certain types of bankcards when, for example, the banking institution chooses to focus on only one type of card. This is accomplished by disabling certain prefix ranges (for example, Diners Cards).

It may be necessary or desirable to begin disabling certain admin cards when, for example, a staff person leaves employment or staff duties change. This is accomplished by disabling certain card number/admin login combinations.

All users access the IC by first dipping a card. The card prefix is compared to valid prefix ranges kept in a database. The exact format of this data, as well as the method and frequency of updates are described below.

In an embodiment of the present invention, a unique International Standards Organization (ISO) standard card prefix is assigned to the IC from the host bank, with the card number having uniquely defined sections. In an embodiment of the present invention, the IC does not use the traditional automatic teller machine (ATM) or customer access terminal (CAT) file informaton for the card prefix information.

In an embodiment of the present invention, one purpose of the Enrollment Station is to collect information on non-bank customers, referred to as "guests" or "other users," and issue "Guest Cards" for their access to the Public User Workstations. The Enrollment Station is physically situated at a Greeter counter, which will be attended by IC staff.

All users of the system (both bank customers and non-bank customers) are encouraged to go through the enrollment process. If, however, a bank customer goes directly to the Public or Private User Workstations, dipping the customer's card allows use of the system.

Some users may want a guest card even though they already are bankcard holders (e.g., they forgot their card that day or they want a guest card for souvenir value). These customers are provided a guest card.

Guest card holders are not allowed to use the Private User workstations. These stations are for users accessing financial applications such as Direct Access and for those wanting extra privacy.

In the process for enrolling guests, the staff person asks the guest whether the guest has a bankcard or credit card for the bank that the guest would like to use for IC access. If the guest has a bankcard the guest wants to use, the guest is asked to dip the card (so the bank can get the guest name and card number). The guest is then requested to provide some basic information. Any information fields that can be filled in from the card dip information are also obtained. The staff person then enters the information into the Enrollment Station.

If the guest does not have the bank's bankcard or wants a guest card, the guest is requested to provide some basic information. The staff person then enters the information into the Enrollment Station.

The staff person then generates a "Guest Card." These cards are printed with the guest's name, logo, and magnetic strip encoded with appropriate information (includes date card generated). The guest then proceeds to Public User Workstation.

In an embodiment of the present invention, the following sets of reports are generated from the enrollment database:

1) Total number of new visits by hour, day, week, month; 2) Total number of new visits broken down by a) non-bank customer visits by hour, day, week, month; and b) bank customer visits by hour, day, week, month; 3) Name, Address, Telephone and email for non-bank customer visits by hour, day, week, month and bank customer visits by hour, day, week, month.

The Enrollment Station can be run in one of three modes: "Enrollment Mode", "User Mode" or "Staff Mode." The modes that a staff user accesses are determined by the staff member's level of entitlement, as described above. The ability to toggle to User Mode is provided so that the staff station can look and act like a normal user for demos or to test out a problem. When the staff person logs on, the session always starts in "Enrollment Mode" if that person's entitlement is Enrollment User; "Staff Mode" if the entitlement is Staff User; and "Staff Mode" if the entitlement is All.

In an embodiment of the present invention, when the Enrollment workstation is in User Mode, it will look like the staff person is running a User workstation, except for two things: 1) the navigation bar has the words "Enrollment WS" on it; and 2) there is an additional button on the Tool Bar to toggle between modes. All other functions operate exactly as described for the User WS.

When the Enrollment workstation is in Enrollment Mode, it allows the staff user to access functions relating to enrollment of users (both guest and login users). It has the same three sided wrapper as the User WS (see below), but the functions available on the Navigation Bar and Tool Bar are specific to the enrollment user. A detailed description of the contents of each pan of the wrapper for Enrollment Mode is provided below. It the enrollment mode is left untouched for a pre-defined time period, it automatically returns to the user mode.

When the Enrollment workstation is in Staff Mode, it allows the staff user to access the functions having to do with configuring and running the IC. It has the same three sided wrapper as the Staff workstation, but the functions available on the Navigation Bar and Tool Bar are specific to the staff user. (The functionality of the Staff Workstation is described in the Staff Workstation requirements section below.)

When the Enrollment workstation is started, it is in Enrollment Mode. There is a toggle button on the Tool Bar to allow the staff user to change to User Mode (and Staff Mode if the user has the proper entitlement). Selecting the toggle button changes all the options on the Navigation Bar and Tool Bar to look like a User Workstation (with the exceptions described above) for User Mode. There is no special authorization needed for the staff user to switch to User Mode Once the staff user has placed the Enrollment workstation in User Mode they can switch back by selecting the toggle button on the Tool Bar to change to Enrollment Mode (or Staff Mode if they have the proper entitlement). When the toggle button is selected, a password popup appears. The staff user must re-enter the login password to return to Enrollment Mode or Staff Mode. This is to prevent a person from getting access to administrative functions accidentally or maliciously. If the person fails the authorization challenge, the station remains in the User Mode.

The Enrollment workstation is accessed by dipping a Login Card with entitlement of Enrollment User or All and entering a legal login name and password. The Enrollment Station uses the three sided wrapper design for its GUI. The content and names of some of the buttons and screens differ from the Staff and User Workstations. The Branded Bar for the Enrollment Workstation is the same as for the User WS (see below).

The Navigation Bar for the Enrollment Station contains an indicator (such as the text "Enrollment WS") to clearly identify the session as an enrollment session. This is to prevent a staff user from getting confused when entering User Mode. This indicator on the Navigation Bar tells the user they are actually in an enrollment session, rather than a normal user session. In addition to this indicator, the Navigation Bar contains buttons for functions specific to the current operating Mode of the workstation, as described further below.

The Navigation Bar for the Enrollment Station in User Mode has the same functions as described in the User Workstation Requirements. The Navigation Bar in User Mode looks visually distinct from the Navigation Bar in the other modes The Navigation Bar for the Enrollment Station in Enrollment Mode presents functions related to enrolling users. The Navigation Bar in Enrollment Mode looks visually distinct from the Navigation Bar in the other modes. In an embodiment of the present invention, the enrollment functions include: 1) Enroll New Guest; 2) Enroll Banking Institution Customer; 3) Modify Guest Card; 4) Generate Login Card; and 5) See Statistical Summary. The functionality of each of these buttons is described further below.

The Enroll New Guest function displays a form to collect information about the user, including name, address, telephone number (home and office), indication whether the user is a bank or non-bank customer, email address, and level of familiarity with Internet. When all fields are full, the greeter submits the information. A confirmation popup appears to recap the information and ask the greeter if they are ready to generate the guest card. If the greeter says yes, the application sends the information to the card writer to generate the card. If the greeter says no, no card is generated.

The Enroll Banking Institution Customer function first requests the customer's bankcard. The card reader then reads the customer name and card number off of the card. When a successful card dip has occurred, the system displays a form to collect information about this person. The form includes name (this will be filled in from information read off the card), telephone number (home and office), email address, and level of familiarity with the internet. The system includes a disclaimer indicating that this information is for bank use only.

For guests that want to correct their name (since they will see this at the user workstation if personalization is enabled) or for those who forget their Guest Card and want to get a new one for this visit, the system allows the administrators to call up user information, modify it, if necessary, and either rewrite the existing card or generate a new one. However, since nearly all of the user information collected when generating a New Guest is optional, it is not guaranteed that the bank will have enough information to find the correct record.

The Modify Guest Information selection includes the following functions: 1) display of a form to collect the search criteria (name and/or card number); 2) search of the database to try to find the correct record; and 3) if the correct record is found, an option for the staff to correct the data and generate another Guest Card.

The "Generate Login Card" function simply generates a Login card (a card with a prefix that tells the system to display the login screen when dipped). In order to use this card to access the staff functions, staff users must also enter a login account, password, and level of entitlement. The login accounts are created in a separate process, as further described below.

The "See Statistical Summaries" function displays a menu of the possible MIS reports (see further description below). Each selection on this menu displays a different report. The reports is printable using the browser Print function.

The Navigation Bar for the Enrollment workstation in Staff Mode has the same functions as described in the Staff Workstation Requirements. The Navigation Bar in Staff Mode is visually distinct from the Navigation Bar in the other modes.

The Tool Bar for the Enrollment Station is essentially the same for all modes. All of the tool bar buttons as described in the User Workstation Requirements are present, with the addition of a Mode Toggle button, which allows the staff user to toggle between Enrollment Mode, User Mode, and Staff Mode, depending on the level of entitlement. Any differences among modes are described below.

The Tool Bar for the Enrollment WS in User Mode has the same functions as the User WS, plus a Mode Toggle button. The Tool Bar for the Enrollment WS in Enrollment Mode has the same functions as the User WS, plus a Mode Toggle button. The Tool Bar for the Enrollment WS in Staff Mode has the same functions as the User WS, plus a Mode Toggle button. The whiteboard is the area where the browser or application plays, and this area is the same for the Enrollment WS in Enrollment Mode as for the User WS; the browsers have the full range of functionality enabled for the Enrollment WS in Enrollment Mode.

The staff sessions do not have a session time limit, like the user sessions. However, there is an inactivity timer, so that the workstation will go into a password protected screen saver mode if no activity has occurred for some period of time. The period of trigger for the inactivity timeout is set at the Staff workstation and is the same for all workstations. If the workstation goes to the screen saver because of inactivity during an enrollment session, touching the keyboard or mouse will bring up a password screen, requiring the staff user to reenter the password before returning to the session.

There are two types of user workstations, public and private. The following requirements spell out details for customer access and interactivity at the public workstation, which are setup in front of the video wall, and for the private work stations, which are setup away from the video wall in the same location. The interface of both the private and pubic user workstation is the same, except for customer privacy, which is intended for personal usage of online banking at the private user workstations, and for interactivity with the video wall, which is only for the Public Workstations.

A typical User Workstation for an embodiment of the present invention will now be described.

Figure 3:
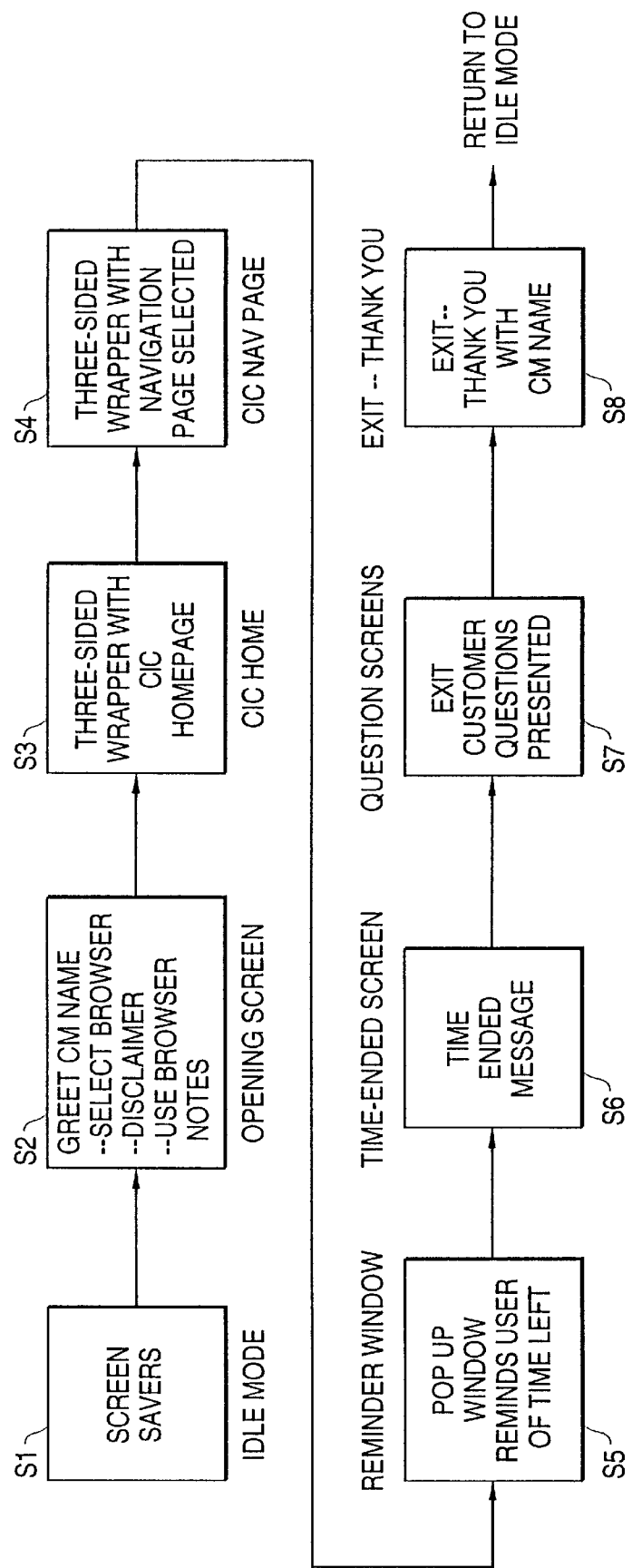
FIG. 3 is a block diagram of the steps of the method of an embodiment of the present invention FIG. 4 contains a diagram of the elements of the graphical user interface (GUI) for an embodiment of the present invention.

In an embodiment of the present invention, as shown in FIG. 3, a typical IC Workstation (both public and private) session includes the following steps. Initially the workstation is in an idle mode S1. During this time a screen saver is displayed. The screen saver cycles among information explaining the info zone, instructing one on how to begin, and sampling IC content. Upon dipping a bankcard, credit card, or a Guest Card, the opening screen is displayed S2. At this point, the customer name is displayed. It is also at this point that the customer must select an internet browser (the customer can change browsers at the Workstation Toolbar afterwards during a session). A legal disclaimer banner is then shown. Together with the legal disclaimer is a short note explaining that the use of bookmarks will not be saved from session to session.

The next screen S3 presents the three sided wrapper with the selected browser displaying the IC Homepage, which is resident on a local server. This IC Homepage contains introductory content to the IC. It also includes a link to the IC beginner's tutorial. The user session timer starts upon access of this screen. When the user clicks on a navigation button, a navigation page S4 corresponding to the navigation button clicked is displayed within the browser. This navigation page contains up to 25 links relating to the subject matter of the button.

When the user reaches five minutes before the time limit, a pop-up window is shown S5 to the user as a reminder of the time limit and to advise printing any material desired. When a user reaches the time limit for the session (which is parameter-driven and determined by the Info Master), a time-ended screen S6 is presented explaining this fact and taking the user to a satisfaction questionnaire screen S7. The user can choose to complete to the questionnaire or skip it. On completing the questionnaire, skipping it, or leaving the screen inactive for a time (which is parameter-driven), the screen goes to an exit (thank you) screen S8. Also, a user can choose to end the session early. This selection also takes the user to the questionnaire screen. The user can choose to answer the questionnaire or skip it. After a time (which is parameter-driven), the screen saver takes over again S1.

In an embodiment of the present invention, the staff workstation used by staff onsite at the IC is referred to as the Information Master (IM). The IM controls the content on the video wall of the present invention by controlling the Video Wall Controller. The IM also controls the configurations on the user workstation from the staff workstation and is able to view and modify the guest database from the staff workstation.

The IM can choose to turn the session timer off, in which case the user is allowed to remain on the system as long as the user wants or until a forced shutdown (see below) occurs or the session timer is enabled by the IM. In this case, the user does not see a time remaining timer on the workstation screen.

If the IM enables the session timer when a user has already been on with no timer for some time, the time remaining timer appears on the user workstation starting with the maximum time and counting down. Thus, for example, if the user has been on for two hours with the session timer turned off and the IM then enables the session timer to 15 minutes, the user receives 15 more minutes before the session is terminated normally.

If the IM turns off the session timer when a user has already been on the system with a session timer running, the time remaining timer simply disappears from the user workstation, and the user is allowed to remain on the system as long as desired, until a forced shutdown occurs, or until the session timer is enabled by the IM and expires.

There are occasions in which customers are not able to use their full allotment of time on a workstation due to scheduled demonstrations, end of the business day, or foreseen or unforeseen situations. In these situations, the system allows the IM to issue a shutdown command to all workstations (no individual). This shutdown command causes a pop up box to appear (similar to the timeout reminder popup) on all the users' screens. This command informs them of the shutdown and instructs them to finish. The shutdown command displays, on the pop-up box, a set or configurable amount of time before the forced shutdown. At shutdown, the customer is led to the Satisfaction Questionnaire Screen.

In an embodiment of the present invention, if the IM decides a user is doing something inappropriate or is distracting, the IM can choose to end that user's session. If this occurs, a pop-up appears on the user's screen informing the user that the session is being terminated, and then the session ends. The next screen that appears is the between session screen saver In an embodiment of the present invention, for logons at User Workstations, all card numbers are logged at each card dip. These card numbers are stored on the local database and can be segregated by customer type (e.g., bankcard, Visa Card, MasterCard, Diners, Guests) and accessed for marketing purposes on demand either via a dump of the card numbers onto a disk or via local access to the database directly.

Figure 4:
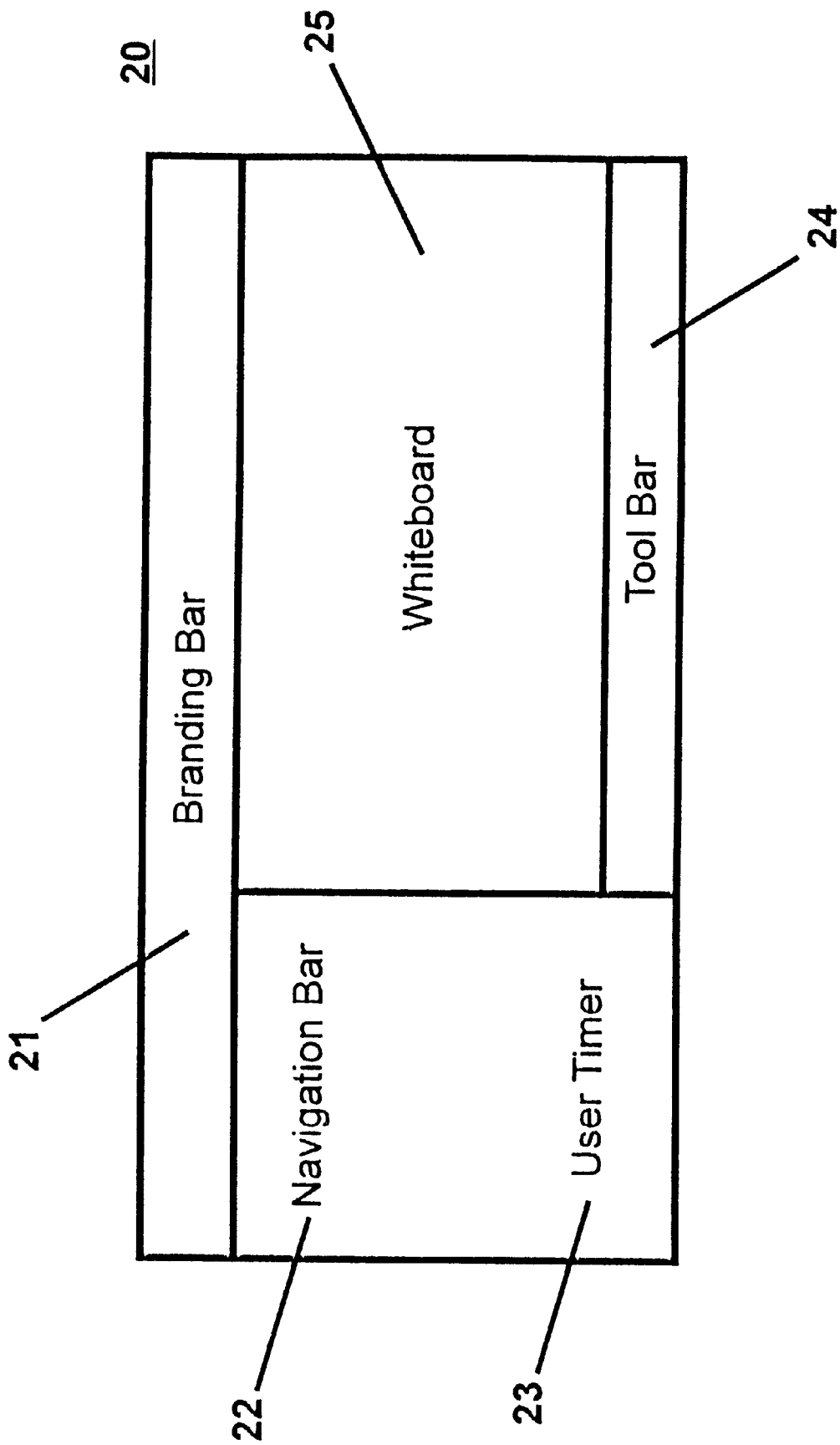

In an embodiment of the present invention, the IC user workstation GUI enables the customer to navigate through content and access applications. In an embodiment of the present invention, as shown in FIG. 4, the wrapper 20 consists of a graphic which is the "Branded Bar" 21 at the top of the screen, a branded vertical "Navigation Bar" 22 on the left, a "User Timer" 23, a "Tool Bar" 24 at the bottom of the screen, and a "Whiteboard" section 25.

On the opening page, the user is addressed by name, as entered by the non-customer at the enrollment station, or as read from the bankcard.

The user workstation tool bar includes up to ten buttons on a graphic background. These buttons include the following: 1) share; 2) grab; 3) send email; 4) select browser; 5) help; 6) overhead television channel selection; 7) volume control; 8) session timer; and 9) exit.

In an embodiment of the present invention, sharing refers to the display of user workstation whiteboard content onto a specific section of the video wall. Sharing is enabled when the IM sets up the system to allow it. If the IM so chooses (e.g., during a seminar), sharing will not be permitted. When sharing is temporarily disabled by the IM, the share button on the user workstation Tool Bar is grayed out.

When the user selects the share option, the system attempts to put the user's whiteboard content on the video wall. There are two possible results of this action: 1) the content is successfully displayed on the video wall; if the content is successfully displayed on the video wall, the "share" button becomes a "release" button (allowing the user to release the space on the video wall); or 2) the content cannot be displayed on the video wall. If the content cannot be displayed on the wall (e.g., insufficient space available), the user is presented with a pop-up telling the user that the request to share was denied and to try again later.

Once the content of the user's whiteboard is displayed on the video wall, the user can choose to stop sharing and release the space. There are three ways a shared space can be released: 1) the user can voluntarily release the space by selecting the "release" button; when the shared space is successfully released the "release" button becomes a "share" button once more; 2) the user can voluntarily release the space by ending the User Workstation Session; any shared space related to that session is automatically released at the end of the session; and 3) the IM can choose to release the space that is in use by any user if the IM decides that the content being shared is inappropriate, offensive, distracting, or otherwise should be released. The user is presented with whatever is in the background if the release of space occurs.

In an embodiment of the present invention, the contention for video wall spaces to share content is on a first-come-first-serve basis. The IM is able to override or deny access to the user to continue sharing.

In an embodiment of the present invention, the user is also able to grab content from pre-defined areas on the video wall onto the user workstation whiteboard area. Selecting the grab button displays a representation of the current video wall layout. From this display the user selects the active content to grab. This content is grabbed and the browser displays it on the workstation.

In an embodiment of the present invention, the user is able to send email from the user workstation. In an embodiment of the present invention, the email name sent out in messages (in brackets "< >") is the user name taken from card dip at the beginning of the session. In an embodiment of the present invention, there is no capability for receiving email at the user workstations. When the user clicks on the send email button, email sender instructions appear. This set of instructions informs the user that they are responsible for the content of the message sent and warns the user not to send inappropriate messages. In addition, an embodiment of the present invention has the capability to restrict the content of messages, as determined by the IM.

In an embodiment of the present invention, the preliminary selection of a browser occurs at session initiation. The "Select Browser" function allows the user to swap from the currently running browser to the unselected browser. Each selectable browser keeps its own context, but does not share context. For example, if the user swaps from a first browser to a second browser, the second browser does not start on the same page as the user was last on in the first browser. The second browser also will not contain any bookmarks the user set in the first browser. However, if the user returns to the first browser, the user returns to the same page that was left, with all the bookmarks as previously set while in that browser.

The user can use all functions available in the browsers except moving or sizing of the browser size and location on the whiteboard. If the user closes the browser, the user can start it again from the select browser function on the tool bar.

In an embodiment of the present invention, filters are included within the system for the web browsers to prevent access to selected locations, as selected by the IM. For example, the filters can prevent access to competing web sites of other banking institutions or inappropriate web sites for a public environment. The filtering element of the system, which is known in the art, allows the owner of the system to decide what websites are appropriate and to block access to other websites selectively. For example, URL's and links to pornographic, sexually harassing, or otherwise politically incorrect sites can be blocked.

Further, staff users can "kill" a workstation by revoking the user's access at any time. Finally, as discussed further above, user time is limited by variable amounts.

An embodiment of the present invention includes IC Help screens. The IC Help is a series of HTML pages describing how to use the user workstation interface and any proprietary IC functionality. It includes a top-level table of contents, an index page, and a FAQ section. Help pages are available for the Navigation bar, the Tool bar, and the timer. There are also pages with information on the browsers that are available. In addition to the general help on the user interface, there are also help pages describing the functionality of the individual buttons. The IC Help functionality is context sensitive. This means that if the user is in the email application and selects IC Help, the Email Help section is presented.

The overhead television channel selection function allows the user to select and play one of the television channel monitors (located above the video wall) on the user workstation. The user is presented with some representation of the n channel monitors, which clearly displays the following information: 1) the monitor number (e.g., 1–5); 2) the physical channel number (what channel is the box tuned to); 3) the logical channel name (e.g., call letters); and an icon/graphic associated with the logical channel (if there is no specific icon/graphic for some channel, a default icon/graphic is displayed with the logical channel name overlaid).

In an embodiment of the present invention, when the user selects one of these channel monitors, a window appears in the user's whiteboard space with the same broadcast content as the channel monitor selected, and if there is related web content available, a browser area appears with Intercast or related web content for this channel. At the same time, the audio for the selected channel begins playing on the speakers for the workstation (see further discussion regarding speakers below). When the user selects some other function to be displayed in the whiteboard space, the broadcast and audio terminate.

The Tool Bar contains a button that represents the volume control. The Volume Control is a master "switch" that controls the volume of any application running in the white board, including the television signals and multimedia embedded into Web Pages.

Sound is provided to individual users via an audio imager, a specialized directional speaker, known in the art, that is placed over an individual workstation. The speaker allows approximately 20/80% sound control, which means the user receives 80% of the sound for what is shown on the user's monitor and 20% from ambient background. Other users have the same split so that each can concentrate on the sounds and images on their individual workstations, but still hear in the background other activities at the IC.

As discussed above, the session timer determines the maximum amount of time a user can spend in a single session. When the session timer is active, the user sees a timer on the user's screen, which displays the time remaining in the session.

Upon clicking the "exit" button a pop-up window appears to confirm the choice to end the session. If the customer chooses not to respond to the pop-up window, the box simply disappears after a few seconds and the screen saver mode takes over. If the user chooses to end the session by clicking on the pop-up window, they are sent to the "Satisfaction Questionnaire" screen. The user can choose to complete the questionnaire or skip it. The IM is able to easily change these questions and view reports of the responses on the staff workstation.

The answering or skipping of these questions brings the user to the "Exit Thank You" screen. In an embodiment of the present invention, a personalized customer farewell is presented at this screen. Personalized means the customer's name is used in the farewell message. Each time a user exits a session, the system will restore the default settings of any browsers that could have been changed by the user during the session.

In an embodiment of the present invention, the navigation button has a configurable set of 10 buttons. The top-level categories of the Navigation Bar are: 1) Bank Home Page; 2) Business Tools; 3) News Center; 4) How To Channel; 5) Cool Site Links; 6) Special Promotions; 7) IC Calendar; 8) Entertainment; 9) Your Community; and 10) Search. In an embodiment of the present invention, these top-level categories are not configurable by the users or the staff.

Upon clicking a navigation button, the whiteboard space shows a navigation page corresponding to the navigation button. It presents a configurable collection of up to 25 URL links. The IM maintains and edits the links on these navigation pages. These URLs are packaged into the navigation pages with a unique look and feel relating to the subject matter of the navigation page.

In an embodiment of the present invention, if the user encounters a link to a password protected site, the software on the user workstation provides a transparent authentication to these sites that does not require the user to enter passwords.

Below are listed example URL sublinks for an embodiment of the present invention. For the bank Home Page, sublinks include US Business site and D.A 6.1. For Business tools, sublinks include Financial Calculators, Stock Market Ticker link, and Portfolio viewer link. For the News Center link, sublinks include various news home pages. For the How to link, sublinks include various how to related home pages.

In an embodiment of the present invention, for Special Promotions, the system links to a Special Promotion page hosted on the Business site. This Special Promotion page is produced by the business hosting an IC. It is maintained as part of the Business's presence on the bank's Home Page. This link gives the business an opportunity to present special marketing and sales promotions at the IC. On the Special Promo page is a hot-link to the US Call Center email address, to which the customers direct any product inquiry.

The IC Calendar link leads to a calendar application located on the local server. In an embodiment of the present invention, there are four subcategories on the Calendar application: 1) view; 2) events; 3) special events; and 4) sign-up. In "view," the user can select among Today view; Tomorrow view—next 24 hours; This Week view—next 7 days; This Month view—next 30 days; and Special Events This Month View—next 30 days. Clicking on "Events" produces the "Special Events This Month" view, plus a description page of the events. Events include infomercials on Flow to use selected features, How to buy stock from an ATM or CAT, and Internet Basics.

The Special Events calendar can include such things as a Tutorials and In House promotions. The sign-up calendar contains ad hoc events that are signed up for by users on a first-come first-serve basis.

In an embodiment of the present invention, the "entertainment" link contains links to entertainment sites.In an embodiment of the present invention, the "search" link contains links to search engines.

In an embodiment of the present invention, the User Workstation Whiteboard displays the following applications: 1) a Web Browser; 2) television on PC—The system uses a PC-TV board to bring broadcast television content (cable or satellite) onto the whiteboard space; 3) Email; 4) Viewing Office Applications via plugins dynamically; and 5) 2-way videoconferencing.

In an embodiment of the present invention, entire customer profiles are not kept; in this embodiment, IM and User W/S each point to different databases. These databases are used to extract information for reports necessary for each IC. The database linked to the User Workstation keeps track of customer usage information. This data includes: 1) the number of customer sessions per user workstation; 2) the number of error access (using invalid card); 3) the average session time; 4) the site traffic to various listed URLs and applications; 5) browser preferences; 6) special sites (i.e., subscription) traffic; 7) number of emails sent; 8) number of requests to bank call center; and 9) frequency of Usage.

A key part of the IC is the video wall. In an embodiment of the present invention, the video wall for the pilot includes a 4×2 set of video cubes. The purpose of this component is to attract users to observe and use the IC. It is also be a means a creating community, when features enabling users to interact with the wall and share work are active. In another embodiment of the present invention, the video wall is comprised of eight CRT monitors in a four by two cubes setup.

In an embodiment of the present invention, images on the video cubes are driven by a video imaging device engine, known in the art, such as an SGI Onyx, made by Silicon Graphics, Inc., of Mountain View, Calif., which allows the invention to utilize multiple formats of data and present them together. For example, in an embodiment of the present invention, images presented include a Standard & Poor's ticker feed, which is obtained from a satellite feed and is put through a processor, such as a dedicated server or a personal computer (PC). In an embodiment of the present invention, the ticker feed is displayed on the video wall with specialized graphics, a format for a stock ticker that is not generally known by the public. As a result of this approach to images presented, a unique feature of the present invention is the graphic design of information displayed. Another image displayed in an embodiment of the present invention is a calendar of events, which describe the programs for a particular day at the interactive center.

Another image displayed in an embodiment of the present invention is a background still, which is a graphic that functions as a wallpaper backdrop to the remainder of the wall. On top of the wallpaper are video resolution windows of dedicated spaces and predesigned templates on which video contents are displayed, so that, for example, either a seminar or a guest speaker may be shown within the space. The video displayed can include, for example, a commercial or an infomercial that has been provided on a VCR tape.

In an embodiment of the present invention, above the cubes of the video wall are five television monitors displaying cable television. These cable television monitors provide the visitor with current events focus; these monitors are tuned in to whatever the banking institution chooses. In an embodiment of the present invention, for customer attraction purposes, these monitors are tuned to business and financial channels for current events. The purpose of providing news information is to keep customers and other users up to date on day to day events that occur that may impact their lives and financial situations. For example, news that the stockmarket crossed a threshold level may provide pertinent information for customers.

As indicated above, in an embodiment of the present invention, a video imaging engine drives the video wall. Any application that appears on the video wall runs on this machine. The following lists enumerates the key design concepts for the video wall. The video wall real estate is configured and displayed in terms of layouts. A layout consists of windows that can hold different types of content. Per layout, the content holder windows have fixed position and size. Signature features (e.g., calendar and stock ticker) are presented in all layouts. In an embodiment of the present invention, a layout has no more than four unrelated dynamic pieces of information at one time. For the most part, the layout is able to run unattended.

A number of different types of content are displayed on the video wall. The IC customer will see static or dynamic graphic images, movies, scrolling text, animations, and/or web browsers on the wall. Each type of content is delivered with a high degree of quality and the integration of these types of content are seamless as far as the viewer is concerned.

Examples of specific content displayed on the video wall include a calendar application, a stock ticker application, a graphic stock volume application, scrolling text messages, static graphic images, video sources, digital sources, internet browsers, and computer programs. These content sources are described in more detail below.

The Calendar Application shows the upcoming events at the branch. This application is web-based. The data for the calendar events is entered at the IC staff workstation. This information is updated when new data is published from the staff workstation, but is static (noninteractive) on the video wall, otherwise. Features of the calendar are as follows: 1) although the calendar is based on the same database as calendar on user workstation, the size and proportion of the calendar on the video wall differs from the user workstation; 2) the calendar is configured (events entered and edited) at IC staff workstation; 3) it includes current time and date; 4) view modes include today—tomorrow—special events; and 5) a static calendar graphic is included.

The Stock Ticker is an application that runs on the video imaging engine and reads from a market data provider feed. The stock ticker is configurable by ticker source. The ticker source can be configured to select the major exchange (e.g., NYSE, NIKKEA) display mode. The view of the data displayed can be configured in the following ways: 1) converted to feed of selected stocks or all stocks, such as translating raw feed stock symbol to full stock name or displaying company name and stock price; 2) used to create stock groups (configured by staff user) of up to ten groups with up to 30 stocks per group; each group can be named and displayed as name and price or based on performance index; the groups may be continuously rotated; 3) display speed; the speed of the ticker text as it crosses the screen can be configured; and 4) if the stock market activity exceeds the ability to fully display trades, data is removed per a configuration parameter and caught up as quickly as possible. The above properties are configured at the IC staff workstation. The stock ticker is configured before it is put in a layout, but its properties are also modifiable during the run time. During Dow Jones hours, the data is presented live. After the market closes, the data displayed is true closing values.

The Graphic Stock Volume Application displays stock volume information. This application runs on the video imaging engine by reading from a feed from a market data provider. This application is configured at the IC staff workstation.

A scrolling text message can be either text input by the IC or news feed. Text Input is performed by the IM at the Staff WS. The video wall displays the message as a single line of text, horizontally scrolling from right to left. The IM can stop the text stream from the Staff WS and activate a news feed. Sources for the news feed can include various commercial news providers.

Static graphics images may be displayed on the video wall as backgrounds or borders. The image files used in a specific layout are configured at the IC staff workstation. In an embodiment of the present invention, the preferred format of the image files is BMP or GIF. The images are created to fit the area in which they are shown. A number of different video sources may be used to project information on the video wall. The possible video sources for the video wall include live camera input, laser disc, cable/NTSC signal, DVD, Beta Cam, VHS I Super VHS/8 mm, and converted VGA from a Workstation whiteboard.

In an embodiment of the present invention, the digital sources for the video wall are digital movies striped onto and read directly from the disk of the video imaging engine. Examples of such video are digitized existing bank advertising footages and created animation.

In an embodiment of the present invention, up to three internet browser windows run on the video wall at one time. The browser is driven by a script and rotates through a series of URLs unattended, or it can be actively changed by commands from the staff workstation. The selected browser is chosed to be compatible with the system that runs the video wall.

For tutorial and presentation situations, the present invention projects computer programs running on the staff workstation onto the video wall. Examples of such programs include standard office applications softward.

Each layout includes of a number of content containers. Each container has a set of one or more different kinds of content that can be placed in that space. At run time, a container has only one type of content running in that space. The content containers included in an embodiment of the present invention are branded background container, calendar container, stock ticker container, barker text container, small video/app container, large video/app container, and border container. Each of these containers is described further below.

A Branded Background container contains one of two types of content sources, a static graphic images—static "branded" background; or a digital source—dynamic background. The stock ticker container includes a stock ticker application. The calendar container contains one of two types of content sources, a calendar or a static graphic images (background). The barker text container includes a scrolling text message.

Within some of the video wall layouts are up to three small video/application containers or one large video/application container with the capability of displaying various types of input. The signal routing is configured at the staff workstation. A Small or Large Video/Application container includes one of the following types of sources: 1) video sources; 2) digital sources; 3) internet browsers; 4) computer programs; or 5) a graphic stock volume application. The only difference between the Small and the Large Video/Application container is the physical dimensions (pixel size) and geographical placement of the containers on the video wall.

A Border container can contain one of the following types of content sources: nothing (blank); or a static graphic image (background).

In an embodiment of the present invention, for the Detailed layout/template designs, there are a total of 11 templates defined. They include 1–4) Four Rest Mode Templates; 5–6) Two Single Video/App Window Templates; 7–8) Two Dual Video/App Window Templates; 9–10) Two Triple Video/App Window Templates; and 11) One Big Video/App Window Template.

Figure 5:
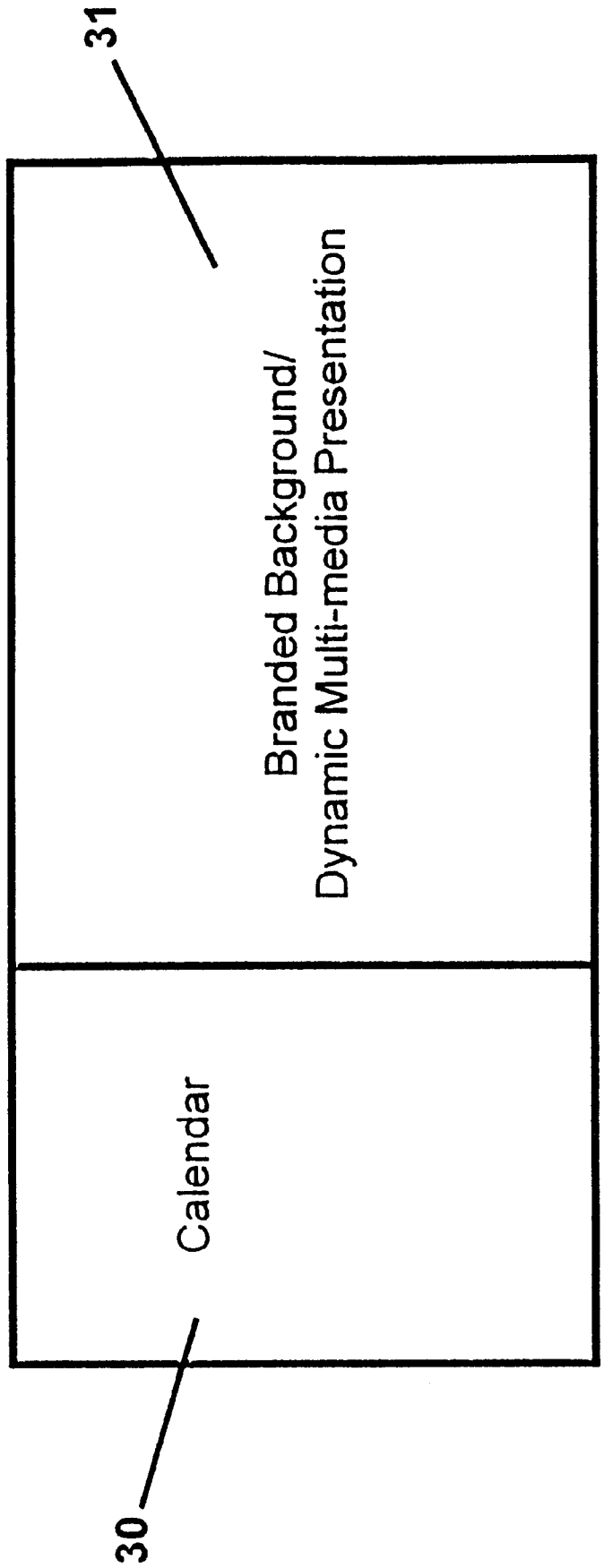
FIG. 5 presents an example layout for the first rest mode template for the video wall of an embodiment of the present invention.
Figure 6:
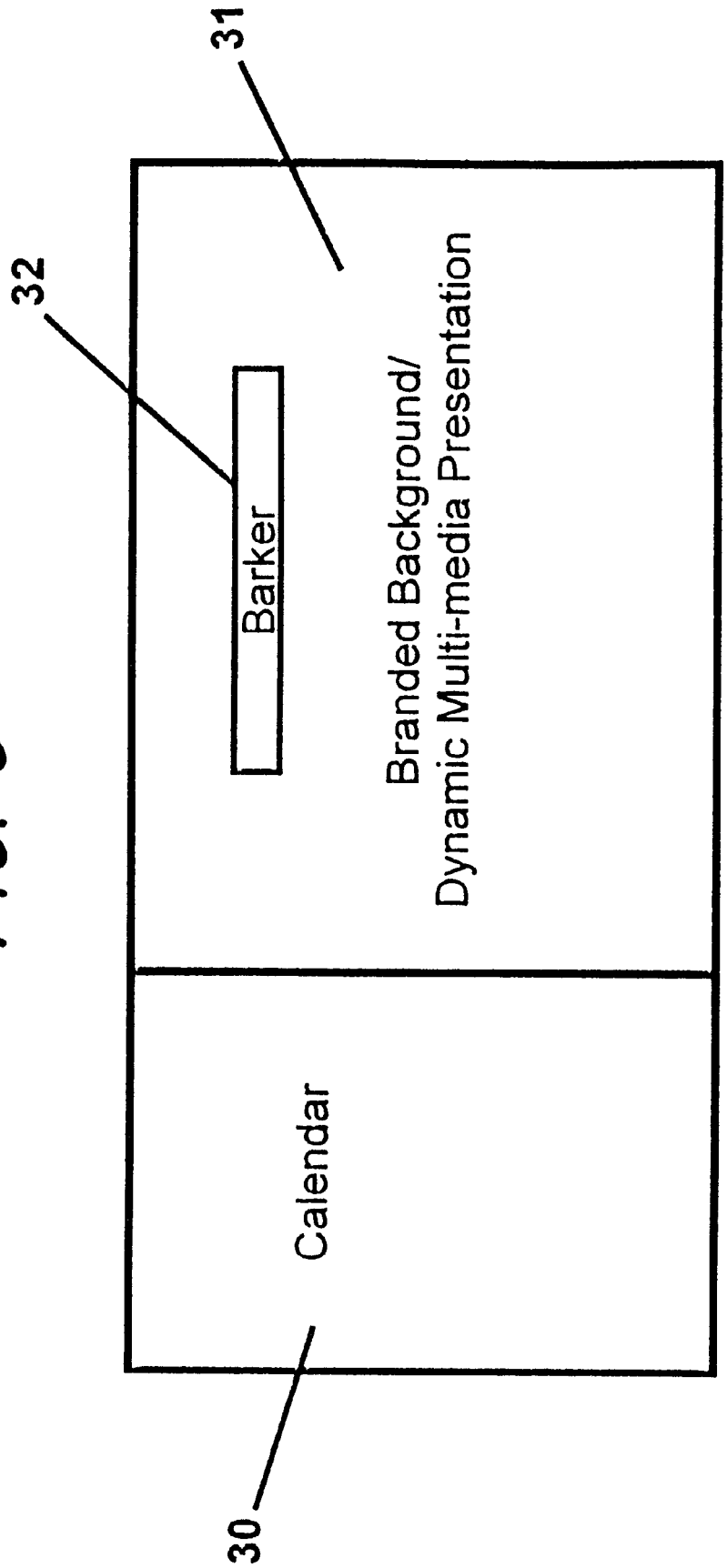
FIG. 6 presents an example layout for the second rest mode template for the video wall of an embodiment of the present invention.

For the first rest mode template, shown in FIG. 5, which is used during non-operating hours, the wall other than the Calendar window 30 is devoted to an animated branded background 31. No other activity is on the wall. This template functions as the "screen saver" for the video wall during non-operating hours. For the second rest mode template, shown in FIG. 6, which is used during non-operating hours with barker 32, the template is the same as the first rest mode template, but a barker 32 is also used.

Figure 7:
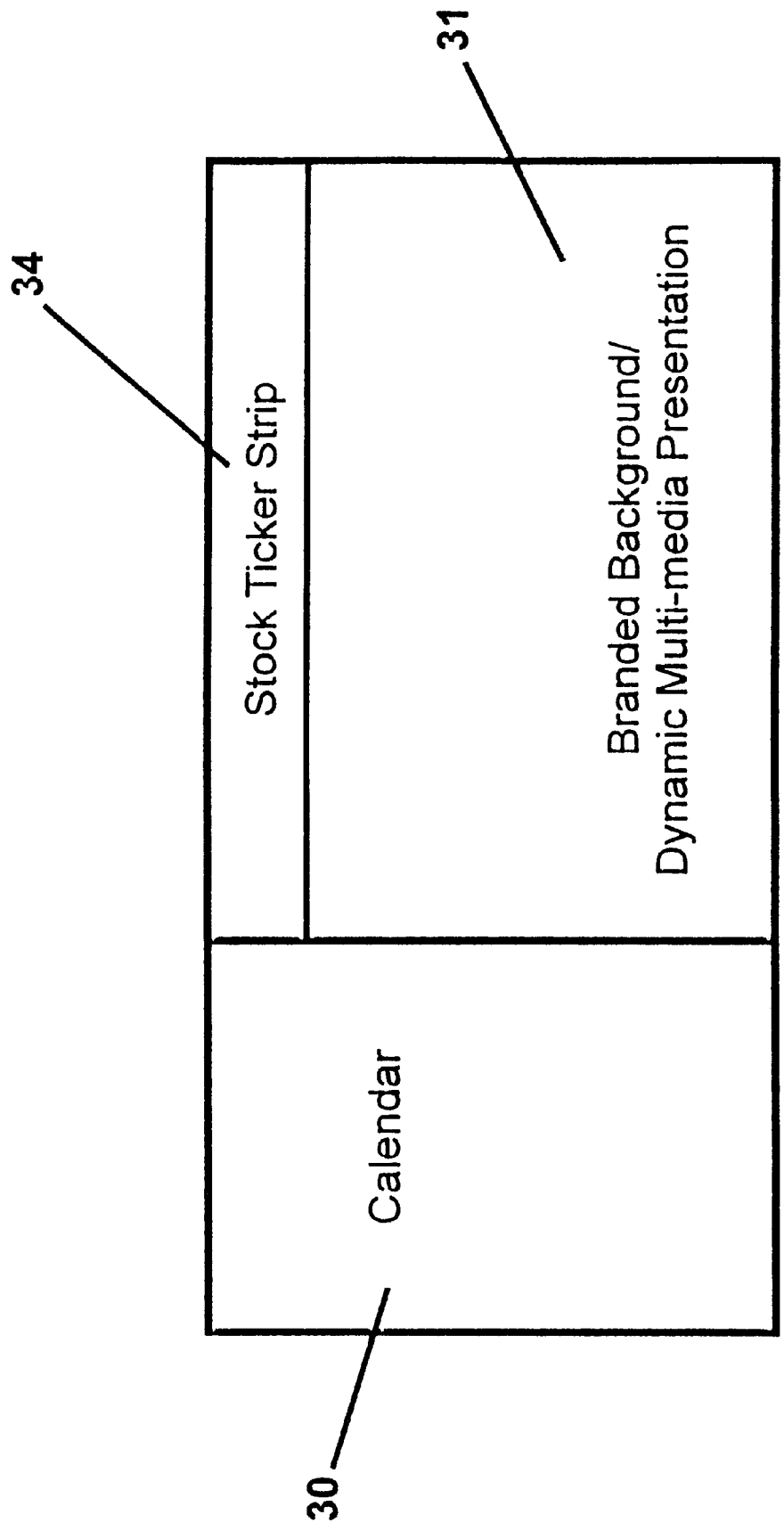
FIG. 7 presents an example layout for the third rest mode template for the video wall of an embodiment of the present invention.
Figure 8:
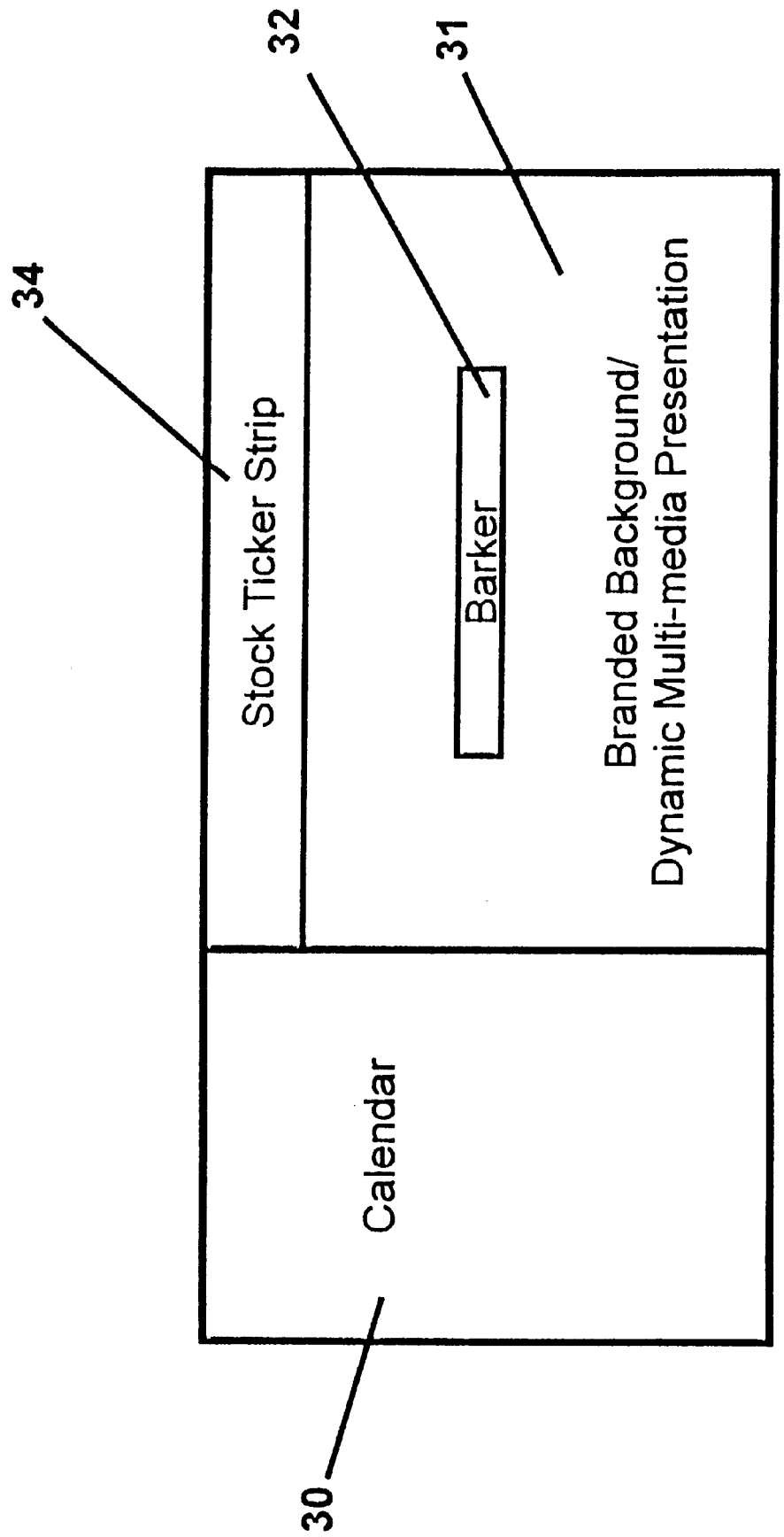
FIG. 8 presents an example layout for the fourth rest mode template for the video wall of an embodiment of the present invention.

For the third rest mode template, shown in FIG. 7, which is used during operating hours using a dynamic multimedia presentation, a stock-ticker 34 is turned on and the branded background 31 is running. This is also the template for a dynamic multimedia presentation that takes over the entire Branded Background window 31. The fourth rest mode template, shown in FIG. 8, which is also used during operating hours, includes a barker 32.

Figure 9:
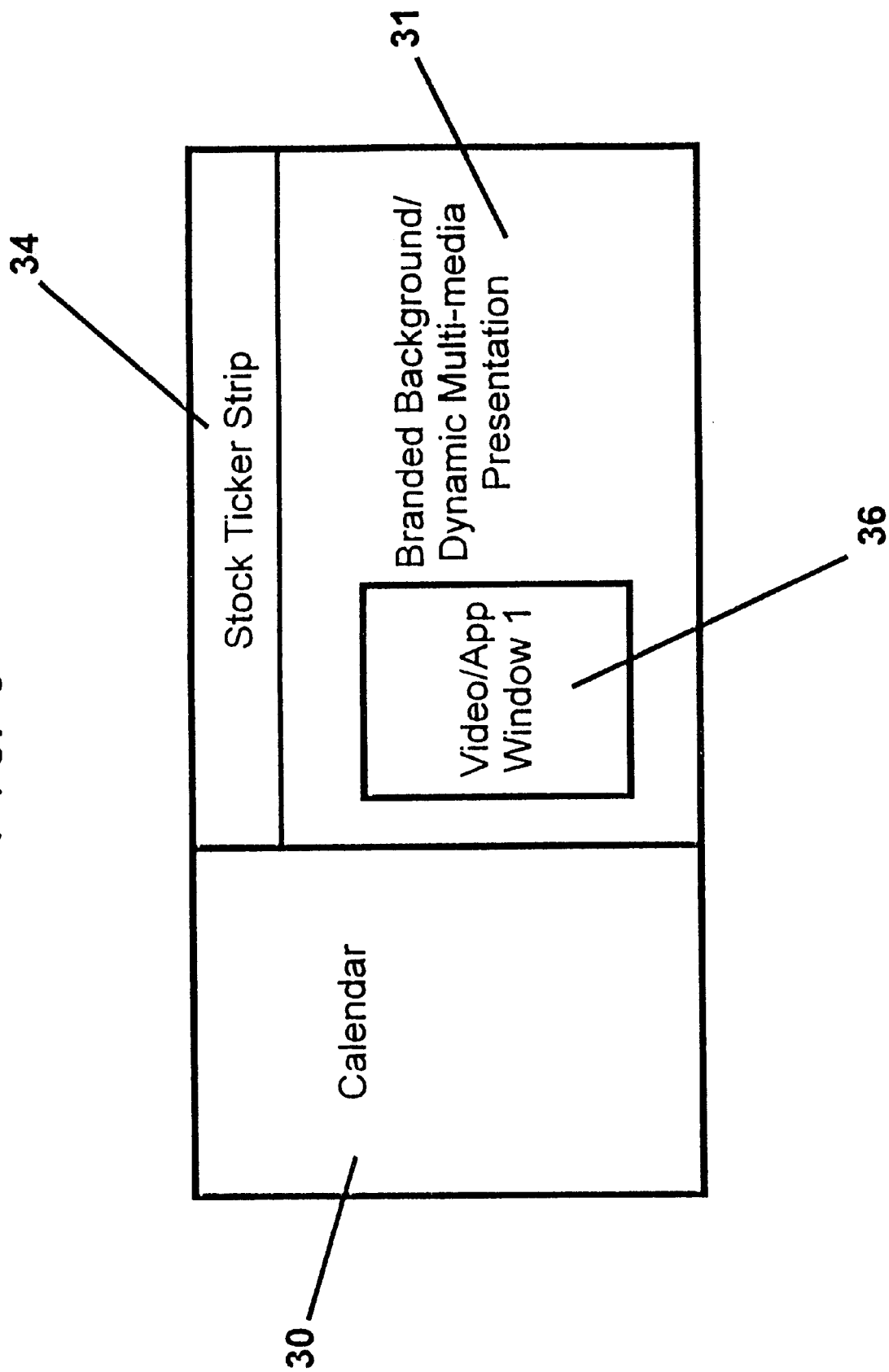
FIG. 9 presents an example layout for the first single video/app window template for the video wall of an embodiment of the present invention.
Figure 10:
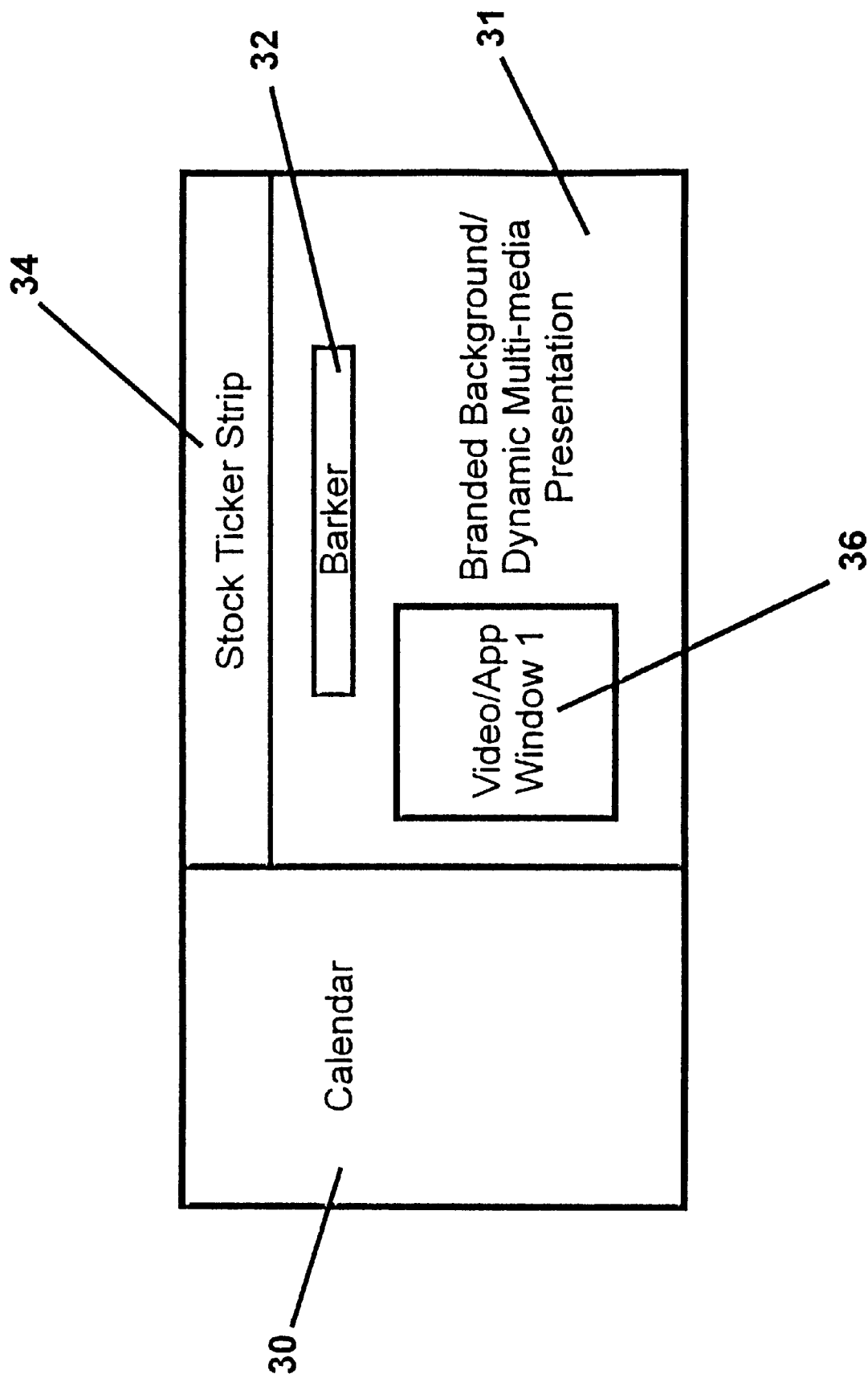
FIG. 10 presents an example layout for the second single video/app window for the video wall of an embodiment of the present invention.

The first single video/app window template is a single video res window, shown in FIG. 9, which takes over the central portion of the Branded Background window 31. This single video/app window 36 displays the following sources of application: one internet browser window, one stored (resident on video wall computer only) video image, one external video image, and one stock volume application. The second single video/app window, shown in FIG. 10, is the same as the first (FIG. 9) but includes a barker 32.

Figure 11:
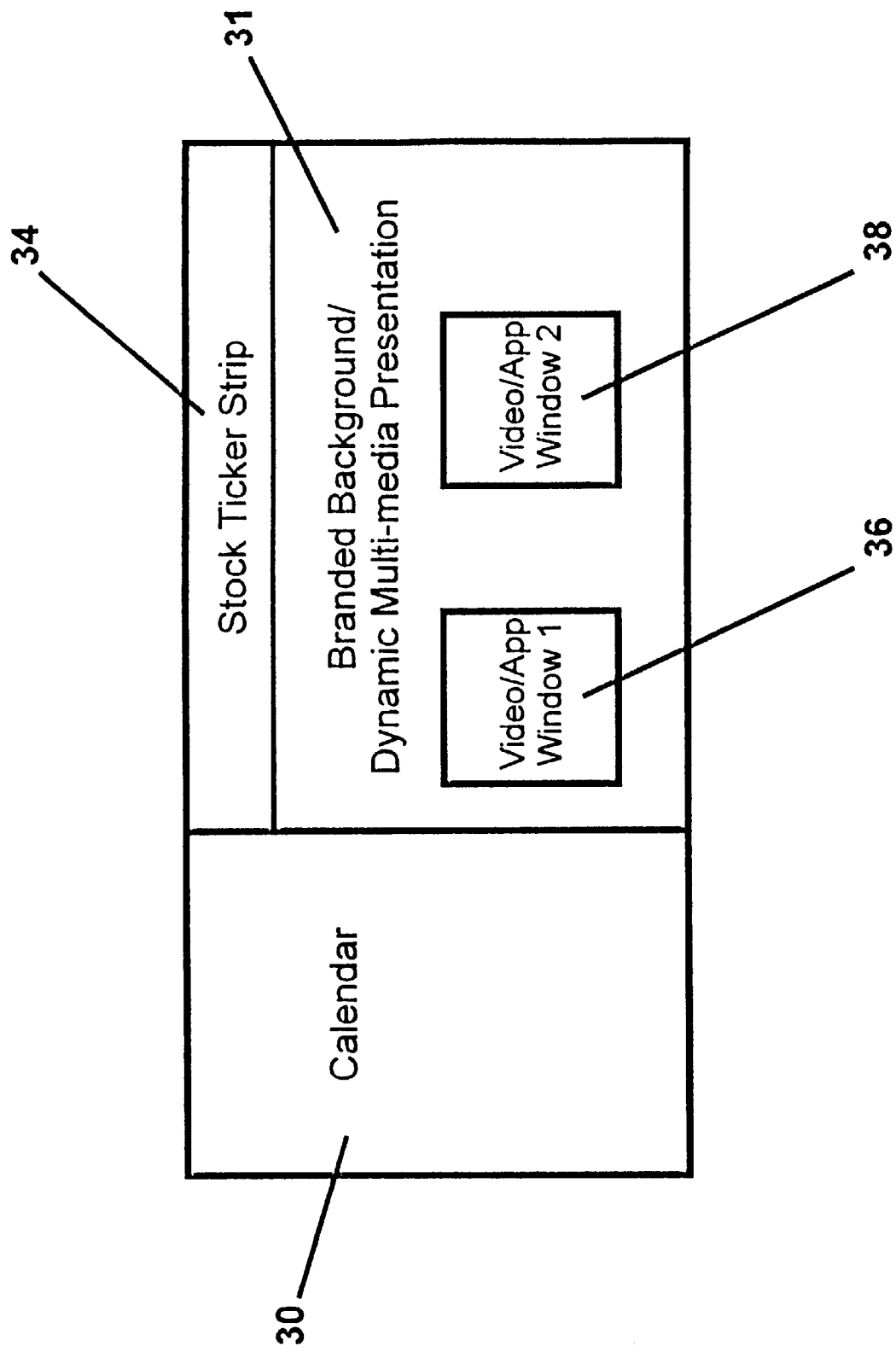
FIG. 11 presents an example layout for the first dual video/app window template for the video wall of an embodiment of the present invention.

The first dual video/app window template, shown in FIG. 11, features the same functions as the first single video/app window template (FIG. 9), but has one more video/app window 38. All of the applications run on either of the video/app windows. The two windows 36, 38 can display different applications simultaneously; for example the first video/app window 36 can run an internet browser while the second video/app window 38 runs a live video feed, or vice-versa.

Figure 12:
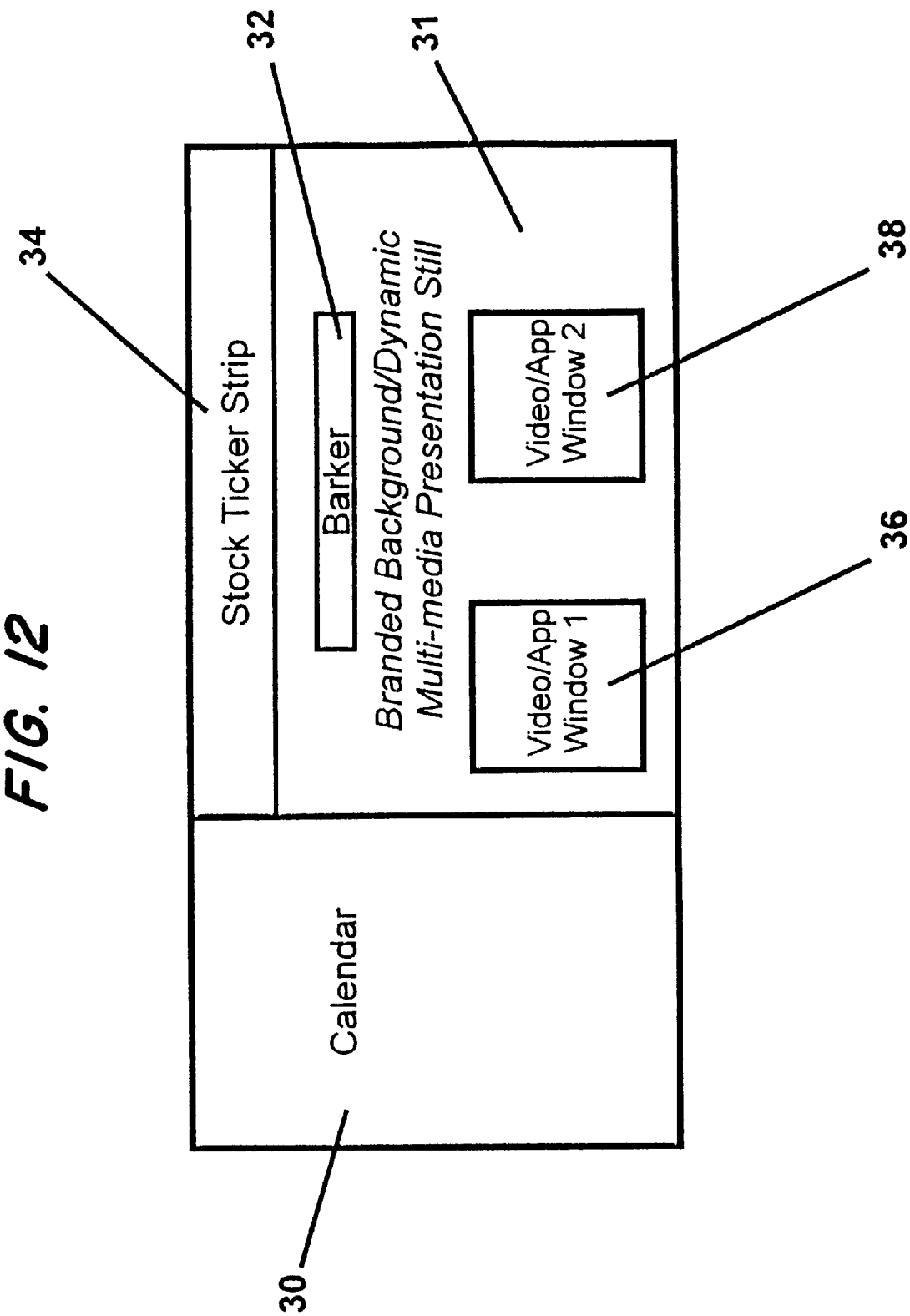
FIG. 12 presents an example layout for the second dual video/app window template for the video wall of an embodiment of the present invention.

The second dual video/app window template, shown in FIG. 12, is the same as the first (FIG. 11) except that a barker application 32 is turned on at the same time. The background window 31, whether running a branded background or a dynamic multimedia presentation, is turned into a still image of the background application. This is based on a design guideline of not having more than four pieces of dynamic information on the wall at the same time.

Figure 13:
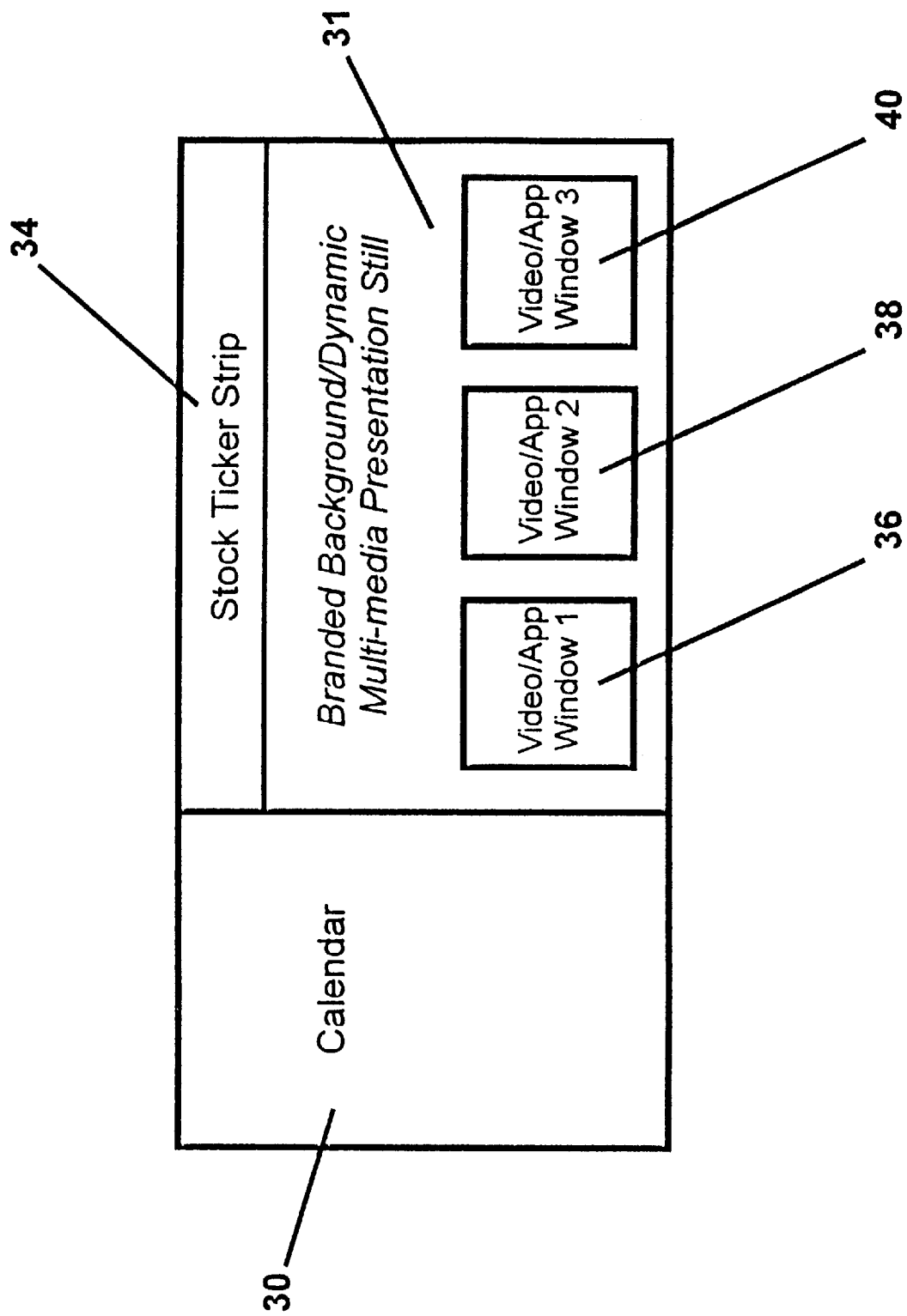
FIG. 13 presents an example layout for the first triple video/app window template for the video wall of an embodiment of the present invention.

The first triple video/app window template, shown in FIG. 13, features the same applications as the first (FIG. 11) and second (FIG. 12) dual video/app window template, but has three video/app windows 36, 38, 40. All of the applications run on any of the video/app windows 36, 38, 40. In an embodiment of the present invention, all three windows display different applications simultaneously. For example, the first video/app window 36 runs an internet browser while the second video/app window 38 runs a live video feed, and the third video/app window 40 runs a stored digital video.

Figure 14:
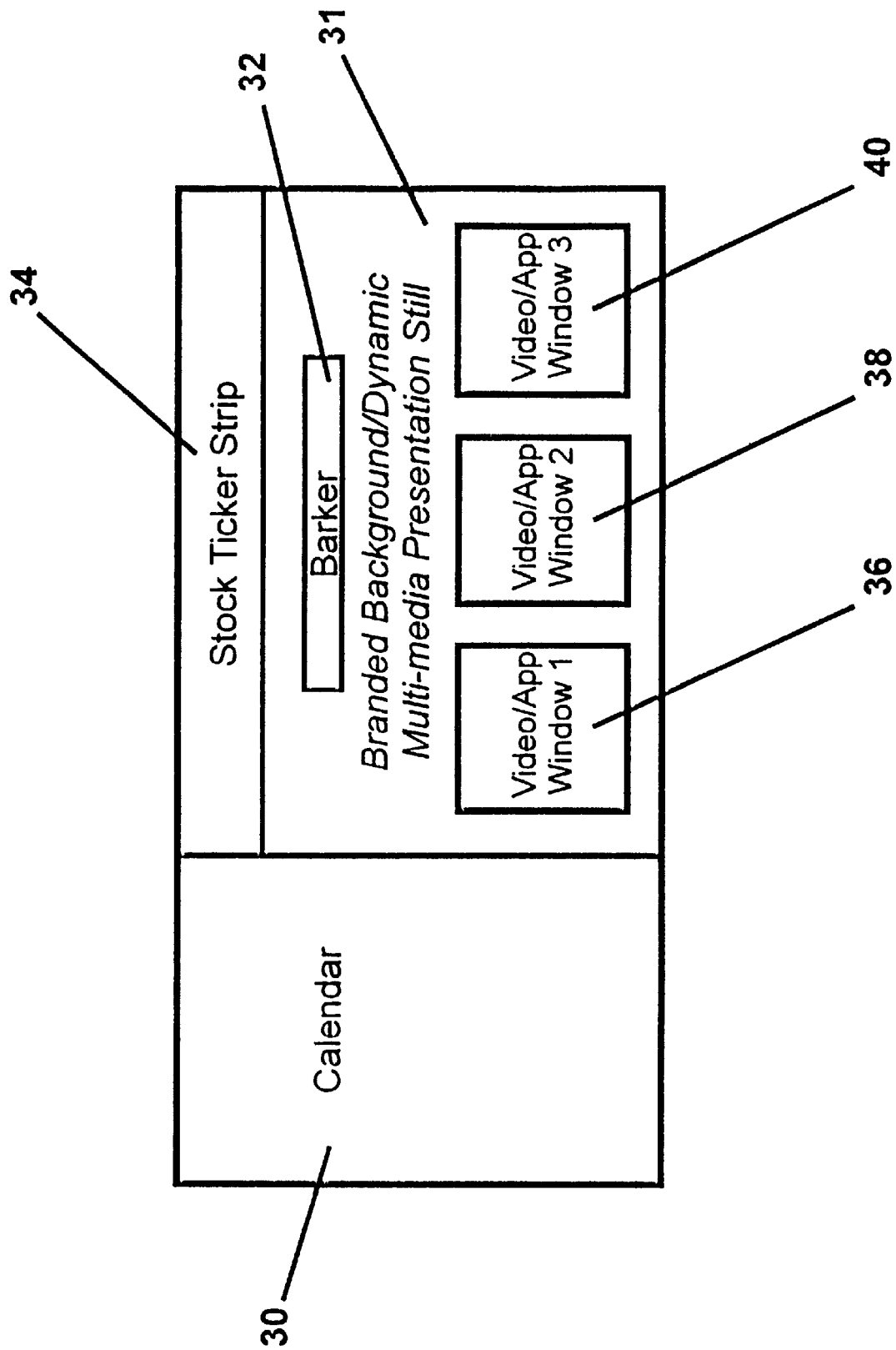
FIG. 14 presents an example layout for the second triple video/app window template for the video wall of an embodiment of the present invention.

The second triple video/app window template, shown in FIG. 14, is the same as the first (FIG. 13) except that the barker application 32 is in use at the same time. This is the only session where potentially more than four dynamic information events occur on the wall at the same time.

Figure 15:
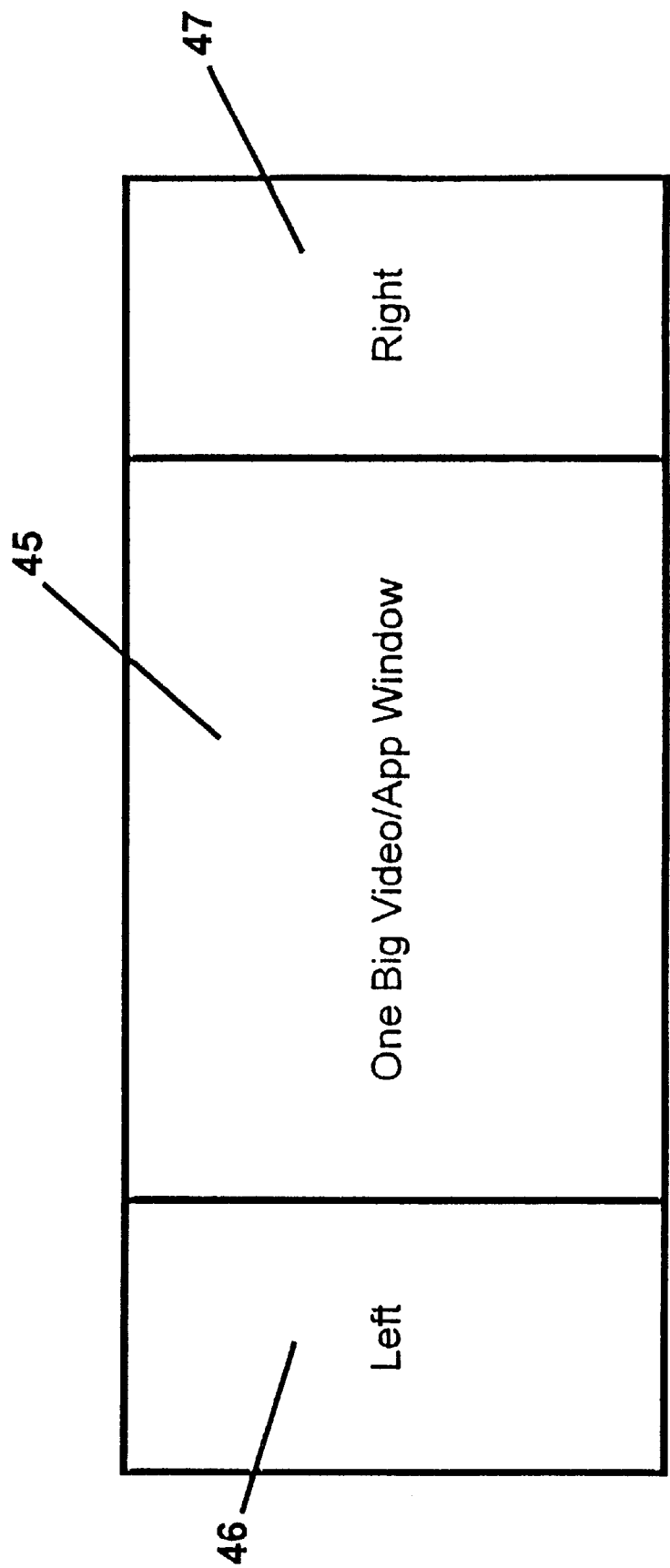
FIG. 15 presents an example layout for the one big video/app window template for the video wall of an embodiment of the present invention.

For the one big video/app window template, shown in FIG. 15, a single video/app window 45 appears in the center of the video wall. This template runs the same application in the smaller video/app windows 46, 47. This is useful in export presentation.

As indicated above, in an embodiment of the present invention the Video Wall Controller is a video imaging engine, such as an SGI Onyx. The day-to-day operations of this machine are configured and controlled from the IC Staff Workstation through a message interface. Staff work directly with the Video Wall Controller only when loading media onto disk (using, for example, DAT drive), when calibrating the video wall, and when a manual reset of the video wall or controller is needed. Customers and other non-staff users are prevented access to this machine.

In an embodiment of the present invention, local access to the Video Wall Controller is through password protected accounts. In an embodiment of the present invention, one administrative login and one non-administrative login for this box are configured. An embodiment of the present invention includes capability for remote access to the Video Wall Controller.

The staff workstation is accessed by card. Any workstation can be logged into as a staff workstation, and there is a dedicated station at which the IM works. The Staff Workstation is run in one of 3 modes: "Staff Mode," "User Mode," or "Enrollment Mode." The Staff Workstation has same wrapper as User Workstations, including the Branded Bar, Navigation Bar, Tool Bar, and Whiteboard. As in the User Workstation, functionality is largely delivered for the Staff Workstation through web content.

When the Staff Workstation is in Staff Mode, it allows the staff user to access all the administrative functionality for configuring and controlling the Information Zone. It has the same three sided wrapper as the User Workstation, but the functions available on the Navigation Bar and Tool Bar are specific to the staff user.

For a staff user entitled to "All" access privileges, there is no special authorization needed for the staff user to switch to "User Mode" or "Enrollment Mode." For a staff user entitled only to "Staff" access privileges, there is no special authorization needed for the staff user to switch to "User Mode," but the "Enrollment Mode" is not an available option.

Once the staff user has placed the Staff workstation in "User Mode" or selected the "Staff Mode" or "Enrollment Mode" (if entitled), a password popup appears. The staff user then re-enters the login password to return to "Enrollment Mode" or "Staff Mode" (if entitled). This is to prevent unauthorized persons from obtaining access to administrative functions accidentally or maliciously. If the person fails the authorization challenge, the station remains in the User Mode.

The Branded Bar for the Staff Workstation is the same as for the User Workstation. The Navigation Bar has different contents depending on the current mode. The contents are as follows. In User Mode, the Navigation Bar looks and functions exactly as described in the requirements for the User Workstation. In Enrollment Mode, the Navigation Bar looks and functions exactly as described in the requirements for the Enrollment WS—Enrollment Mode.

In Staff Mode, the Navigation Bar is visually distinct from the Navigation Bar in either User Mode or Enrollment Mode. At the top of the Navigation Bar is text (such as "Staff WS") identifying this session as a staff session. In Staff Mode, the Navigation Bar links to the main categories of administrative functionality. In an embodiment of the present invention, the administrative functions are organized under selected categories such that it is clear to the staff user where to find a particular function and the staff user does not have to search to complete a desired function. Selecting any of the categories brings up a web page (or application, if necessary) in the whiteboard area. The page (or application) displays the relevant sub-menus or further functionality.

The main categories of administrative functionality for the staff Workstation include: (1) Media Install; (2) Video Wall Template Control; (3) Channel Monitor Configuration; (4) User WS; (5) Report Manager; (6) Filter Maintenance; and (7) Backups. The functions included in each of these categories are described below.

The Media Install category includes all functions having to do with installing/striping media to disk and specifying sources that are not on the disk. The functions in this category are: 1) media install—select/specify a source (not a disk); and 2) media install—load/stripe media onto disk.

Functions for the user for the Media Install—select/ specify a source (not a disk) include: 1) selecting from a list of sources (e.g., CD ROM, DVD player, Beta Cam) already known to the system; 2) specifying a new source not yet known to the system; and 3) providing a source with a name (which will later appear in Template config). In an embodiment of the present invention, appended to the source functions is information about the source.

Functions for the user for the Media Install—load/stripe media onto disk include: 1) loading media from DAT tape drive; 2) specifying striping parameters (e.g., frame size, on how many disks, compression); and 3) starting/stopping the striping procedure.

The video wall category includes all functions relating to configuring and run time controlling the video wall features. These features are grouped into four sub-categories: 1) Template Configuration; 2) Application Configuration; 3) Video Wall Control; and 4) Speaker Control.

The Video Wall—Template Configuration category includes all functions relating to configuring templates that can be run from the Video Wall Control functions. In an embodiment of the present invention, the functions in this category include: a) Template Configuration—configure a template; and b) Template Configuration—scripting of templates. The functionality for Template Configuration—configure a template includes: 1) select a template by name from a list; 2) specify media or app to play in each template window; and 3) content types: stock ticker named configuration, calendar, sushi bar, browser, media, and barker text. The functionality for Template Configuration—scripting of templates includes: 1) create a new script and give it a name; 2) create entries for script, select a time for entry, and select template to be started at that time; and 3) edit existing scripts and delete scripts The Video Wall—Application Configuration category includes all functions relating to configuring applications used in the IC. These application configurations become content for insertion into the windows of a template. The functions in this category incluee: a) Application Configuration—Barker Text config; b) Application Configuration—Calendar config; c) Application Configuration—Stock Ticker config; and d) Application Configuration—Internet Sushi Bar URL List config.

The functionality for Application Configuration—Barker Text config includes: 1) create a new barker text and give it a name, select source with input text and news feed, enter text or news feed parameters, and set speed and other parameters; 2) edit an existing barker text; and 3) delete an existing barker text.

The functionality for Application Configuration—Calendar config includes: 1) view the calendar in all modes available at user WS; and 2) elect and edit a day. The elect and edit a day function includes the following: 1) create shortcuts for today, tomorrow, and any valid date up to six months in advance; 2) copy event or all events from a different date to selected date; 3) move an event or all events to a different date to selected date; 4) add new events to selected day with selected event time, entered event text (20 chars), set event type as special or normal, provide event description of up to 128 characters, and edited existing events on the selected day; 5) change event time within day with changed event text, changed event type—special or normal, and changed event description; 6) delete an event or all events for selected day; and 7) clear past events older than 30 days.

The Application Configuration—Stock Ticker config category has several sub-categories of items that are configured: 1) Symbols; 2) Groups; and 3) Named Configurations.

In an embodiment of the present invention, there are two default configurations, one for when exchange is open and one for when exchange is closed.

The Stock Ticker Config—Symbols Maintenance includes as functionality editing a list of stock symbols that are mapped to company name.

The functionality for the Stock Ticker Config—Group Maintenance includes: 1) create a group (limit 12) with assigned name and assign members; 2) edit group name and members; and 3) delete group.

For the Stock Ticker Config—Named Configuration maintenance, a named configuration is a configuration of a number of parameters, which has been given a name. The name appears in the template menus when configuring templates that include a stock ticker. Functions available include: 1) create a named configuration—the user may create by copying an existing named configuration, assign a ticker source or sources; 2) select display mode to show converted feed or show groups (if group—includes enable/disable showing of members), or set display properties, including the speed of the ticker and an option to throw away quotes older than a set number of seconds; 3) edit an existing named configuration; and 4) delete an existing named configuration.

The functionality for the Application Configuration—Internet Sushi Bar URL List config includes: 1) create a new list and give it a name; 2) edit an existing list; 3) delete an existing list; and 4) set a minimum of 12 lists with up to 30 URLs per list.

The Video Wall Control category includes all functions relating to running, resetting, and altering the configuration at run-time. The functions in this category include: 1) Video Wall Control—start video wall/run selected template; 2) Video Wall Control—stop video wall; 3) Video Wall Control—send URL to browser on video wall; 4) Video Wall Control—update Stock Ticker running on video wall; and 5) Video Wall Control—change Barker Text Feed.

The functionality for Video Wall Control—send URL to browser on video wall includes: view URL (the text string) currently on each browser window on video wall; enter new URL (the text string) to be sent to browser window on video wall; and display/input field for each browser window on video wall.

The functionality for the Video Wall Control—update Stock Ticker running on video wall includes: 1) view current parameters of Named Configuration in use; 2) edit all parameters of Named Configuration; and 3) apply changes to the wall, save the changes to a database, or both.

The functionality of the Video Wall Control—change Barker Text Feed includes: 1) view current feed source (text or news feed); 2) select new feed source; 3) configure new feed source; and 4) apply changes to video wall.

The functionality for Video Wall—Speaker Control includes control over speaker volume <up/down/mute>.

The Channel Monitor Config category includes all functions relating to configuring the television monitors over the video wall and the information displayed for these monitors at the User WS. The functionality for Channel Monitor config includes: 1) view current monitor/channel assignments; 2) pick a monitor and assign, including channel source, channel number, and channel name/icon; and 3) apply (notifies users of change) or cancel assignment.

The User Workstation category includes all functions having to do with configuring or running (in this case stopping) the User Workstations. These features fall into three sub-categories: 1) Parameters; 2) User Workstation Control; and 3) Edit Web Content.

The User WS Parameters category includes all functions relating to configuring settings and the contents (such as plug-ins) of the workstation. The functions in this category include: 1) Parameters—view/modify user parameters; 2) Parameters—view currently loaded plugins; 3) Parameters—remove plug-ins; and 4) Parameters—download plug-ins to User Workstation.

The functionality for Parameters—view/modify user parameters includes: 1) turn session timer off or on, and if session timer is on, set timeout in minutes; 2) set inactivity timer; 3) enable/disable sharing; and 4) enable/disable personal greeting. The functionality for Parameters remove plug-ins includes remove plugins from Staff Workstation. The functionality for Parameters—download plug-ins to User Workstation includes download plug-ins from Staff Workstation is desirable but not essential.

The User Workstation Control category includes all functions having to do with run time control of the user workstations. In this case, most of the functions relate to terminating sessions either because of inappropriate behavior or because all users need to be off the system for some reason. The functions in this category are: 1) User Workstation Control—kill a user session; 2) User WS Control lockout further logins; and 3) User WS Control forced shutdown of all users.

The functionality for User Workstation control includes: 1) select a user Workstation; 2) select whether to capture URL for filter list; and 3) terminate user session immediately (no graceful shutdown). The functionality for User WS Control lockout further logins includes: 1) select Workstation to lockout (all, Public, Private); and start/stop lockout. The functionality for User WS Control forced shutdown of all users includes: 1) select Workstation to shutdown (all, Public, Private); 2) set time when shutdown should occur—in minutes (in 10 minutes) or specific time (at 5 pm); and 3) start/stop shutdown.

The staff user can change the contents of some of the web pages used by the IC. The kinds of pages that are editable are as follows: 1) Edit Web Content—change navigation pages; and 2) Edit Web Content—change user questionnaire.

The Edit Web Content—change navigation pages function provides a mechanism for editing the up to 25 navigation entries on a navigation page. Each page has a minimum of five navigation entries. In an embodiment of the present invention, the user cannot change other aspects of the page, such as page title, background, graphics, or fonts. The functionality for Edit Web Content—change navigation pages includes: 1) view current navigation page(s); 2) assign new text for entries displayed on page; 3) assign new URLs to go with text entries; 4) assign new icons/logos to go with text; 5) add entries (up to 25); and 6) delete entries (must leave five minimum).

The Edit Web Content—change user questionnaire has three fixed multiple-choice questions, one changeable multiple-choice question, and one changeable open-ended question. The functionality for this control includes: 1) view previous questionnaires; 2) enter new question; 3) enter new multiple choice answers for new question (up to seven); 4) enter new open-ended question; and 5) assign name to answer text field.

The Report Manager category contains all functions relating to creating and viewing reports. In an embodiment of the present invention, all reports are web pages and are printable through the web browser print function.

The Report Manager—Site Traffic Report function includes: 1) number of hits on various URLs and applications; 2) time spent in various top level content categories; and 3) time spent in various listed URLs and applications. The Report Manager—Customer Statistics Report function includes: 1) number of customer sessions per User Station (public and private); and 2) average session time (all user sessions, all machines). The Report Manager—Questionnaire statistics function includes: 1) answers to standard questions; 2) answers to changeable questions; and 3) answers to open-ended questions. The Report Manager—Errors Report function includes: 1) number of failed access attempts; and 2) system errors.

The Site Filter Maintenance category contains all functions relating to maintaining the site filter (or filters) used by the IC. The single function in this category is Site Filter Maintenance—view/modify current filter list. The functionality for this list includes: 1) view list of currently blocked sites; and 2) update list by downloading new lists from service or by entering manually.

The Backups category contains all functions relating to backing up the system. The Backups—view backup info function includes: 1) view date and time of last backup for each component; and 2) view status of each backup (succeeded, failed, in process). Components include Public WS, Private WS, Database, Server, and Video Wall Controller. The Backups—configure backup function includes: 1) select a component or component(s) to backup; 2) set destination for backup data (e.g., tape, JAZZ drive, "mirror site"); 3) set label for backup; and 4) set time to execute backup. The Backups—start/stop backup on a component function includes start configured backup for a specific component. The Backups—start/stop backup on all components function includes start configured backup for all components. The Backups—restore software backup function includes: 1) select a component; and 2) restore software checkpoint.

The Tool Bar for the Staff Workstation is essentially the same for all modes. All of the tool bar buttons as described in the User Workstation Requirements are present, with the addition of a Mode Toggle button, which will allow the staff user to toggle between Enrollment Mode, User Mode and Staff Mode, depending on the level of entitlement of the user.

As with the User Workstation, the whiteboard for the Staff Workstation is the area where the browser or application plays. The browsers have the full range of functionality enabled for the Staff Workstation in Staff Mode.

As with the User Workstation, the Staff Workstation is accessed by dipping a Login Card with entitlement of Staff User or All followed by entering of a recognized login name and password. In an embodiment of the present invention, all card dips at each workstation are logged to provide an audit trail of usage at each station.

What is claimed is:

1. A method for a user to obtain interactive information services on a first network in an interaction area, the interaction area including a shared network video device and a terminal, comprising:

enrolling the user for access to the interaction area;

issuing the user key access to the interaction area;

the user inputting the key access at the interaction area;

the user logging on to the terminal on the network;

associating a connection time limit with the key access;

limiting the user access time to the connection time limit;

providing the logged on user with a selection of interactive information services;

the user selecting an interactive information service; and the user interacting with the interactive information service.

2. The method of claim 1 wherein the enrolling step further comprises:

the user providing user-specific information; and transmitting the user-specific information to a server on the first network.

3. The method of claim 2 wherein the user-specific information comprises the name of the user.

4. The method of claim 1 wherein issuing the user key access further includes authorizing a credit card issued to the user.

5. The method of claim 1 wherein issuing the user key access further includes authorizing a debit card issued to the user.

6. The method of claim 1 wherein issuing the user key access further includes providing a temporary access card to the user.

7. The method of claim 1 wherein inputting the key access further includes dipping a card in a card reader.

8. The method of claim 1 further comprising:

associating a user level with the key access; and providing access only to selected interactive information services for the user level.

9. The method of claim 1 further comprising providing administrative access for a banking institution representative.

10. The method of claim 9 wherein the administrative access comprises user access.

11. The method of claim 9 wherein the administrative access comprises system operator access.

12. The method of claim 9 wherein the administrative access comprises a selection for terminating access by a selected user.

13. The method of claim 9 wherein the administrative access comprises a selection for extending user access time for a selected user.

14. The method of claim 9 wherein the administrative access comprises a selection for shortening user access time for a selected user.

15. The method of claim 9 wherein the administrative access comprises a selection for changing a user level associated with a selected user's key access.

16. The method of claim 9 further comprising varying the administrative access depending on authorization of the banking representative.

17. The method of claim 1 wherein the terminal comprises a personal computer.

18. The method of claim 1 wherein selecting an interactive information service further includes:

the user selecting an option to access a preselected pathway on a second network;

connecting the terminal to the preselected pathway on the second network; and displaying on the terminal information from the preselected pathway on the second network.

19. The method of claim 18 wherein the second network comprises the internet.

20. The method of claim 18 wherein the path-specific information comprises an internet web page location.

21. The method of claim 1 wherein selecting an interactive information service further includes:

the user selecting an option to search a second network;

connecting the terminal to a search function on the second network;

displaying the search function on the terminal; and the user utilizing the search function on the second network.

22. The method of claim 1 wherein selecting an interactive information service further includes:

the user selecting an option to view banking related information; and displaying on the terminal the banking related information.

23. The method of claim 1 wherein selecting an interactive information service further includes:

the user selecting an option to send electronic mail;

presenting the user with an input template for sending electronic mail;

the user inputting information into the input template;

presenting the user with an option to transmit the inputted information; and if the user selects the option to transmit, transmitting the inputted information as electronic mail.

24. The method of claim 1 wherein selecting an interactive information service further includes:

the user selecting an option to view television broadcast information; and displaying at the terminal television broadcast information.

25. The method of claim 1 wherein selecting an interactive information service further includes:

the user selecting an option to view remaining user access time; and displaying on the terminal the remaining user access time.

26. The method of claim 1 wherein selecting an interactive information service further includes:

the user selecting an option to control audio volume;

displaying on the terminal an interactive audio control volume function; and if the user interacts with the interactive audio control volume function, altering audio volume at the terminal.

27. The method of claim 1 wherein the terminal further comprises a directional speaker.

28. The method of claim 1 wherein selecting an interactive information service further includes:

the user selecting an option for interactive banking services; and displaying the interactive banking services at the terminal.

29. The method of claim 28 wherein the banking services comprise home banking services.

30. The method of claim 1 wherein selecting an interactive information service further includes:

the user selecting an option for displaying banking promotional information; and displaying the banking promotional information at the terminal.

31. The method of claim 1 further comprising:

displaying an accessible network display area; and providing the user with an option to share the accessible network display area.

32. The method of claim 31 further comprising:

the user selecting said option to share the accessible network display area;

the user selecting information displayed on the terminal for display on the accessible network display area; and displaying the selected information on the accessible network display area.

33. The method of claim 1 further comprising:

displaying an accessible network display area; and providing the user with an option to grab information from the accessible network display area.

34. The method of claim 33 further comprising:

the user selecting the option to grab the accessible network display area;

the user selecting information displayed on the accessible network display area for display on the terminal; and displaying the selected information on the terminal.

* * * * *